United States Patent
Zheng et al.

(10) Patent No.: US 11,817,970 B2
(45) Date of Patent: **\*Nov. 14, 2023**

(54) METHOD, DEVICE, AND SYSTEM FOR DETERMINING GENERIC ROUTING ENCAPSULATION GRE TUNNEL IDENTIFIER

(71) Applicant: HUAWEI TECHNOLOGIES CO., LTD., Shenzhen (CN)

(72) Inventors: Lianshu Zheng, Shenzhen (CN); Mingui Zhang, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 512 days.

This patent is subject to a terminal disclaimer.

(21) Appl. No.: 17/118,507

(22) Filed: Dec. 10, 2020

(65) Prior Publication Data

US 2021/0167993 A1 Jun. 3, 2021

Related U.S. Application Data

(63) Continuation of application No. 16/010,512, filed on Jun. 17, 2018, now Pat. No. 10,873,478, which is a
(Continued)

(51) Int. Cl.
*H04L 12/46* (2006.01)
*H04L 45/745* (2022.01)
*H04L 45/24* (2022.01)

(52) U.S. Cl.
CPC ........ *H04L 12/4633* (2013.01); *H04L 45/745* (2013.01); *H04L 45/245* (2013.01); *H04L 2212/00* (2013.01)

(58) Field of Classification Search
CPC . H04L 12/4633; H04L 45/745; H04L 45/245; H04L 2212/00
See application file for complete search history.

(56) References Cited

U.S. PATENT DOCUMENTS 10,873,478 B2 * 12/2020 Zheng ................... H04L 45/745
2010/0142539 A1    6/2010 Gooch et al.
(Continued)

FOREIGN PATENT DOCUMENTS

| CN | 101272340 A | 9/2008 |
| CN | 102577330 A | 7/2012 |

(Continued)

OTHER PUBLICATIONS

B. Gleeson et al., A Framework for IP Based Virtual Private Networks, Feb. 2000, rfc 2764, 62 pages.
(Continued)

*Primary Examiner* — Elton Williams

(57) ABSTRACT

The present invention provides a method, a device, and a system for determining a GRE tunnel identifier, applied to a scenario in which there are at least two bonded GRE tunnels between a HAG and HCPE. The method is implemented by the HAG and includes: receiving a service packet that is sent by the HCPE through a first GRE tunnel, where the service packet includes a source IP address of the first GRE tunnel carrying the service packet, and the first GRE tunnel is one of the at least two GRE tunnels; and looking up a correspondence table according to the source IP address of the first GRE tunnel, to determine a tunnel identifier of the first GRE tunnel carrying the service packet, where the correspondence table includes a correspondence between the source IP address of the first GRE tunnel and the tunnel identifier of the first GRE tunnel.

28 Claims, 11 Drawing Sheets

Related U.S. Application Data continuation of application No. PCT/CN2015/097757, filed on Dec. 17, 2015.

(56) References Cited

U.S. PATENT DOCUMENTS

| | | |
|---|---|---|
| 2015/0215810 A1 | 7/2015 | Andreasen et al. |
| 2015/0341263 A1 | 11/2015 | Du |
| 2016/0359745 A1 | 12/2016 | Hao et al. |

FOREIGN PATENT DOCUMENTS

| | | |
|---|---|---|
| CN | 103905284 A | 7/2014 |
| CN | 103986637 A | 8/2014 |
| CN | 104601483 A | 5/2015 |
| CN | 104869042 A | 8/2015 |
| WO | 2009132530 A1 | 11/2009 |

OTHER PUBLICATIONS

Dong Hui et al., Tunnel technology research and application of the SSL VPN, 2012, 4 pages.

Office Action issued in CN202010631680.2, dated Aug. 26, 2022, 9 pages.

N. Leymann, Ed et al., GRE Notifications, draft-heileyi-gre-notifications-00, Interdomain Routing Working Group, Oct. 21, 2013, total 16 pages, XP15095598.

N. Leymann et al., GRE Notifications for Hybrid Access, draft-1 hwxz-gre-notifications-hybrid-access-01, Interdomain Routing Working Group, Jan. 14, 2015, total 36 pages, XP15104019.

N. Leymann et al., GRE Tunnel Bonding, draft-zhang-gre-tunnel-bonding-01, Independent Submission, Internet Draft, Oct. 9, 2015, total 40 pages, XP15108852.

\* cited by examiner

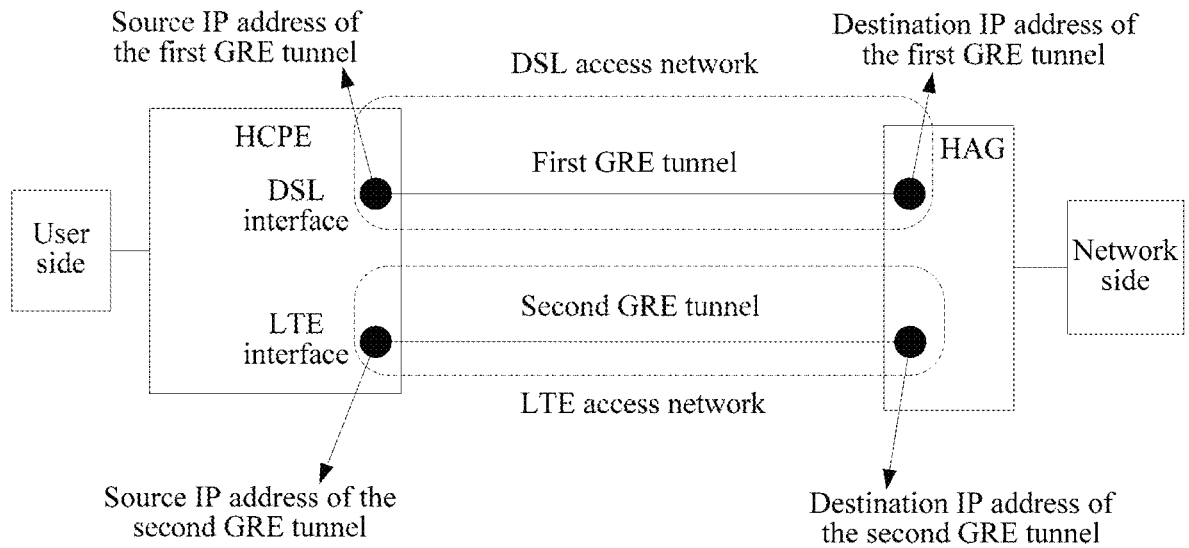

A HAG receives a service packet that is sent by HCPE through a first GRE tunnel, where the service packet includes a source IP address of the first GRE tunnel carrying the service packet, and the first GRE tunnel is one of at least two GRE tunnels — S110

The HAG looks up a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel — S120

FIG. 2

METHOD, DEVICE, AND SYSTEM FOR DETERMINING GENERIC ROUTING ENCAPSULATION GRE TUNNEL IDENTIFIER

CROSS-REFERENCE TO RELATED APPLICATIONS

This application is a continuation of U.S. patent application Ser. No. 16/010,512, filed on Jun. 17, 2018, which is a continuation of International Application No. PCT/CN2015/097757, filed on Dec. 17, 2015. The afore-mentioned patent applications are hereby incorporated by reference in their entireties.

TECHNICAL FIELD

Embodiments of the present invention relate to the communications field, and more specifically, to a method, a device, and a system for determining a Generic Routing Encapsulation GRE tunnel identifier.

BACKGROUND

Hybrid access (Hybrid Access, "HA" for short) is an access technology for bonding a heterogeneous network. In the access technology, a user may access two or more access networks to access a network side. For example, in a home broadband network, a user may access both a fixed access network (for example, a digital subscriber line (Digital Subscriber Line, "DSL" for short)) and a mobile access network (for example, Long Term Evolution (Long term Evolution, "LTE" for short)), so that faster service provisioning services, more reliable WAN connections, and larger bandwidth can be provided to the user.

In a current technology, the HA technology is implemented by means of Generic Routing Encapsulation (Generic Routing Encapsulation, "GRE" for short) tunnel bonding. As shown in FIG. 1, a hybrid customer premises equipment (Hybrid Customer Premises Equipment, "HCPE" for short) on a user side creates a first GRE tunnel that is based on a DSL access network and a second GRE tunnel that is based on an LTE access network to a hybrid access gateway (Hybrid Access Gateway, "HAG" for short) on a network side by using a DSL interface and an LTE interface, respectively. After the first GRE tunnel is bonded to the second GRE tunnel, packets of a same service on the HCPE can be transmitted to the HAG by using the first GRE tunnel and the second GRE tunnel at the same time. Assuming that a bandwidth of the DSL access network is 1 G and a bandwidth of the LTE access network is 1 G; after the first GRE tunnel is bonded to the second GRE tunnel, an access network bandwidth of 2 G may be provided to a user.

However, after two GRE tunnels are bonded, a GRE tunnel through which a service packet is received by the HAG cannot be distinguished. Therefore, currently, an operator urgently needs to resolve the problem.

SUMMARY

The present invention provides a method, a device, and a system for determining a GRE tunnel identifier, so that after at least two GRE tunnels are bonded, a GRE tunnel through which a service packet is received can be flexibly distinguished.

According to a first aspect, a method for determining a Generic Routing Encapsulation GRE tunnel identifier is provided, where the method is applied to a scenario in which there are at least two GRE tunnels between a hybrid access gateway HAG and a hybrid customer premises equipment HCPE and the at least two GRE tunnels are bonded, and the method includes:

receiving, by the HAG, a service packet that is sent by the HCPE through a first GRE tunnel, where the service packet includes a source IP address of the first GRE tunnel carrying the service packet, and the first GRE tunnel is one of the at least two GRE tunnels; and looking up, by the HAG, a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

It should be understood that, in the present invention, the first GRE tunnel indicates either of the at least two GRE tunnels. For example, the foregoing steps for the first GRE tunnel are performed on each of the at least two GRE tunnels.

The source IP address of the first GRE tunnel is the IP address of the tunnel port that is of the first GRE tunnel and that is on the HCPE. Specifically, as shown in FIG. 1, the source IP address of the first GRE tunnel is an IP address of a DSL interface of the HCPE, and a source IP address of a second GRE tunnel is an IP address of an LTE interface of the HCPE.

The tunnel identifier of the first GRE tunnel is used to uniquely indicate the first GRE tunnel. Specifically, for example, the tunnel identifier is a tunnel number of the first GRE tunnel. Assuming that the at least two GRE tunnels include five GRE tunnels, tunnel identifiers of the five GRE tunnels are 1, 2, 3, 4, and 5. It should be understood that, the tunnel identifier of the first GRE tunnel may alternatively use another presentation form that can uniquely indicate the first GRE tunnel, for example, a letter or a Roman numeral. This is not limited in the present invention.

Therefore, in the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing operation, administration, and maintenance (Operation Administration and Maintenance, "OAM" for short) on a GRE tunnel can be met.

Specifically, the HAG may obtain the correspondence between the source IP address of the first GRE tunnel and the tunnel identifier of the first GRE tunnel from the HCPE or may obtain the correspondence from an upper layer device (for example, a network management device or a controller).

With reference to the first aspect, in a first possible implementation of the first aspect, before the receiving, by the HAG, a service packet that is sent by the HCPE through a first GRE tunnel, the method further includes:

receiving, by the HAG, a GRE control packet sent by the HCPE, where the GRE control packet includes information used to indicate the correspondence between the source IP address of the first GRE tunnel and the tunnel identifier of the first GRE tunnel; and obtaining, by the HAG, the correspondence according to the GRE control packet.

It should be understood that, after obtaining the correspondence between the source IP address of the first GRE tunnel and the tunnel identifier of the first GRE tunnel, the HAG stores the correspondence in a local correspondence table. It should further be understood that, the correspondence table includes a correspondence between a source IP address and a tunnel identifier of each of the at least two GRE tunnels.

In the present invention, the HCPE may notify the HAG of a correspondence between a source IP address and a tunnel identifier of a GRE tunnel based on an existing GRE control packet, so that the HAG can flexibly distinguish, according to the correspondence, a GRE tunnel through which a service packet is received. Compared with an existing procedure, there are no additional signaling overheads.

In the present invention, the HCPE notifies the HAG of correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

With reference to the first possible implementation of the first aspect, in a second possible implementation of the first aspect, the receiving, by the HAG, a GRE control packet sent by the HCPE includes:
  in a process of setting up the first GRE tunnel, receiving, by the HAG, a GRE tunnel setup request packet sent by the HCPE, where an attribute field of the GRE tunnel setup request packet includes the information used to indicate the correspondence.

With reference to the first possible implementation of the first aspect, in a third possible implementation of the first aspect, the receiving, by the HAG, a GRE control packet sent by the HCPE includes:
  after the first GRE tunnel is set up, receiving, by the HAG, a first GRE tunnel notify packet sent by the HCPE, where an attribute field of the first GRE tunnel notify packet includes the information used to indicate the correspondence.

With reference to the third possible implementation of the first aspect, in a fourth possible implementation of the first aspect, the method further includes:
  in a process of setting up the first GRE tunnel, sending, by the HAG, a GRE tunnel setup accept packet to the HCPE, where the GRE tunnel setup accept packet includes request information used to request the correspondence; and
  the receiving, by the HAG, a first GRE tunnel notify packet sent by the HCPE includes:
  receiving, by the HAG, the first GRE tunnel notify packet that is sent by the HCPE according to the request information.

With reference to the third possible implementation of the first aspect, in a fifth possible implementation of the first aspect, the receiving, by the HAG, a first GRE tunnel notify packet sent by the HCPE includes:
  sending, by the HAG to the HCPE, a second GRE tunnel notify packet used to request the correspondence; and
  receiving, by the HAG, the first GRE tunnel notify packet that is sent by the HCPE according to the second GRE tunnel notify packet.

Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

According to a second aspect, a method for determining a Generic Routing Encapsulation GRE tunnel identifier is provided, where the method is applied to a scenario in which there are at least two GRE tunnels between a hybrid access gateway HAG and a hybrid customer premises equipment HCPE and the at least two GRE tunnels are bonded, and the method includes:
  determining, by the HCPE, a first GRE tunnel, where the first GRE tunnel is one of the at least two GRE tunnels; and
  sending, by the HCPE, a service packet to the HAG through the first GRE tunnel, where the service packet includes a source IP address of the first GRE tunnel carrying the service packet, so that the HAG looks up a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

Therefore, in the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

With reference to the second aspect, in a first possible implementation of the second aspect, before the sending, by the HCPE, a service packet to the HAG through the first GRE tunnel, the method further includes:
  sending, by the HCPE, a GRE control packet to the HAG, where the GRE control packet includes information used to indicate the correspondence between the source IP address of the first GRE tunnel and the tunnel identifier of the first GRE tunnel.

In the present invention, the HCPE may notify the HAG of a correspondence between a source IP address and a tunnel identifier of a GRE tunnel based on an existing GRE control packet, so that the HAG can flexibly distinguish, according to the correspondence, a GRE tunnel through which a service packet is received. Compared with an existing procedure, there are no additional signaling overheads.

With reference to the first possible implementation of the second aspect, in a second possible implementation of the second aspect, the sending, by the HCPE, a GRE control packet to the HAG includes:
  in a process of setting up the first GRE tunnel, sending, by the HCPE, a GRE tunnel setup request packet to the HAG, where an attribute field of the GRE tunnel setup request packet includes the information used to indicate the correspondence.

With reference to the first possible implementation of the second aspect, in a third possible implementation of the second aspect, the sending, by the HCPE, a GRE control packet to the HAG includes:

after the first GRE tunnel is set up, sending, by the HCPE, a first GRE tunnel notify packet to the HAG, where an attribute field of the first GRE tunnel notify packet includes the information used to indicate the correspondence.

With reference to the third possible implementation of the second aspect, in a fourth possible implementation of the second aspect, the method further includes:

in a process of setting up the first GRE tunnel, receiving, by the HCPE, a GRE tunnel setup accept packet sent by the HAG, where the GRE tunnel setup accept packet includes request information used to request the correspondence; and the sending, by the HCPE, a first GRE tunnel notify packet to the HAG includes:

sending, by the HCPE, the first GRE tunnel notify packet to the HAG according to the request information.

With reference to the third possible implementation of the second aspect, in a fifth possible implementation of the second aspect, the sending, by the HCPE, a first GRE tunnel notify packet to the HAG includes:

receiving, by the HCPE, a second GRE tunnel notify packet sent by the HAG and used to request the correspondence; and sending, by the HCPE, the first GRE tunnel notify packet to the HAG according to the second GRE tunnel notify packet.

Therefore, in the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

According to a third aspect, a network device is provided, where the network device is configured to perform the method according to any one of the first aspect or the possible implementations of the first aspect.

Specifically, the network device may include modules configured to perform the method according to any one of the first aspect or the possible implementations of the first aspect.

It should be understood that, the network device corresponds to the hybrid access gateway HAG in the method according to the first aspect.

According to a fourth aspect, a network device is provided, where the network device is configured to perform the method according to any one of the second aspect or the possible implementations of the second aspect.

Specifically, the network device may include modules configured to perform the method according to any one of the second aspect or the possible implementations of the second aspect.

It should be understood that, the network device corresponds to the hybrid customer premises equipment HCPE in the method according to the second aspect.

According to a fifth aspect, a system for determining a GRE tunnel identifier is provided, where the system includes the network device provided according to the third aspect and the network device provided according to the fourth aspect.

It should further be understood that, the system includes the HAG and the HCPE in the method for determining a GRE tunnel identifier provided according to the first aspect or the second aspect.

According to a sixth aspect, a network device is provided, where the network device includes a memory and a processor, where the memory is configured to store an instruction, the processor is configured to execute the instruction stored in the memory, and execution of the instruction stored in the memory enables the processor to perform the method according to any one of the first aspect or the possible implementations of the first aspect.

According to a seventh aspect, a network device is provided, where the network device includes a memory and a processor, where the memory is configured to store an instruction, the processor is configured to execute the instruction stored in the memory, and execution of the instruction stored in the memory enables the processor to perform the method according to any one of the second aspect or the possible implementations of the second aspect.

In the present invention, when access network types of the at least two bonded GRE tunnels are different, the tunnel identifier of the first GRE tunnel mentioned in the present invention may be directly an access network type (which may also be referred to as a tunnel type) of the first GRE tunnel.

In the foregoing implementations, access network types of different GRE tunnels of the at least two GRE tunnels are different, and the tunnel identifier of the first GRE tunnel indicates an access network type of the first GRE tunnel.

Specifically, an access network type of a GRE tunnel includes a fixed access network and a mobile access network. The fixed access network is, for example, a digital subscriber line (Digital Subscriber Line, DSL) access network, and the mobile access network is, for example, a 3G network or an LTE network.

In the present invention, the HAG obtains correspondences between source IP addresses and access network types of the at least two bonded GRE tunnels, and when receiving a service packet, can flexibly determine, according to the correspondences, an access network type of a GRE tunnel carrying the packet. Therefore, in a GRE tunnel bonding scenario, a GRE tunnel through which a service packet is received can be flexibly and efficiently distinguished, so that a current urgent need of an operator can be met.

In the foregoing implementations, the hybrid customer premises equipment (hybrid customer premises equipment, HCPE) and the hybrid access gateway (Hybrid Access Gateway, HAG) are devices at two ends of a hybrid access tunnel, the HCPE is an access device on a client side, the HCPE includes multiple access network interfaces and sets up GRE tunnels of different access networks to the HAG by using different access network interfaces, and the HAG is an access device on a provider network side.

In the foregoing implementations, that the at least two GRE tunnels are bonded means that packets of a same service can be transmitted on the at least two GRE tunnels at the same time. For example, as shown in FIG. 1, the first GRE tunnel based on the DSL access network and the second GRE tunnel based on the LTE network are set up between the HCPE and the HAG, and the HCPE can transmit packets of a same service to the HAG by using the two GRE tunnels.

In the foregoing some implementations, a format of the GRE control packet is shown in FIG. 4(*a*). The GRE control packet includes an attribute type (Attr Type) field. A value of the attribute type field is an attribute type 55 (Attr Type 55), used to indicate learning of a correspondence between a source IP address and a tunnel identifier of a GRE tunnel. An attribute value (Attribute Value) field of the GRE control packet includes: a tunnel identifier (Tunnel ID) field, a tunnel source IP address (Tunnel Source IP Address) field, and a delivery protocol (Delivery Protl) field. That is, the GRE control packet includes information used to indicate the correspondence between the source IP address of the GRE tunnel and the tunnel identifier of the GRE tunnel.

It should be understood that, a message type (MsgType) field of the GRE control packet is used to indicate a message type of the GRE control packet, and different values of the MsgType field indicate GRE control packets of different types. As shown in Table 1, for example, when a value of the MsgType field is 1, it indicates that the GRE control packet is a GRE tunnel setup request packet; when a value of the MsgType field is 2, it indicates that the GRE control packet is a GRE tunnel setup accept packet; or when a value of the MsgType field is 6, it indicates that the GRE control packet is a GRE tunnel notify packet.

In the foregoing some implementations, a format of the GRE tunnel setup request packet sent by the HCPE to the HAG is shown in FIG. 4(b).

In the foregoing some implementations, a format of the GRE tunnel notify packet sent by the HCPE to the HAG is shown in FIG. 4(c).

Based on the technical solutions of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of an application scenario according to an embodiment of the present invention;

FIG. 2 is a schematic flowchart of a method for determining a GRE tunnel identifier according to an embodiment of the present invention;

DESCRIPTION OF EMBODIMENTS

Figure 3:
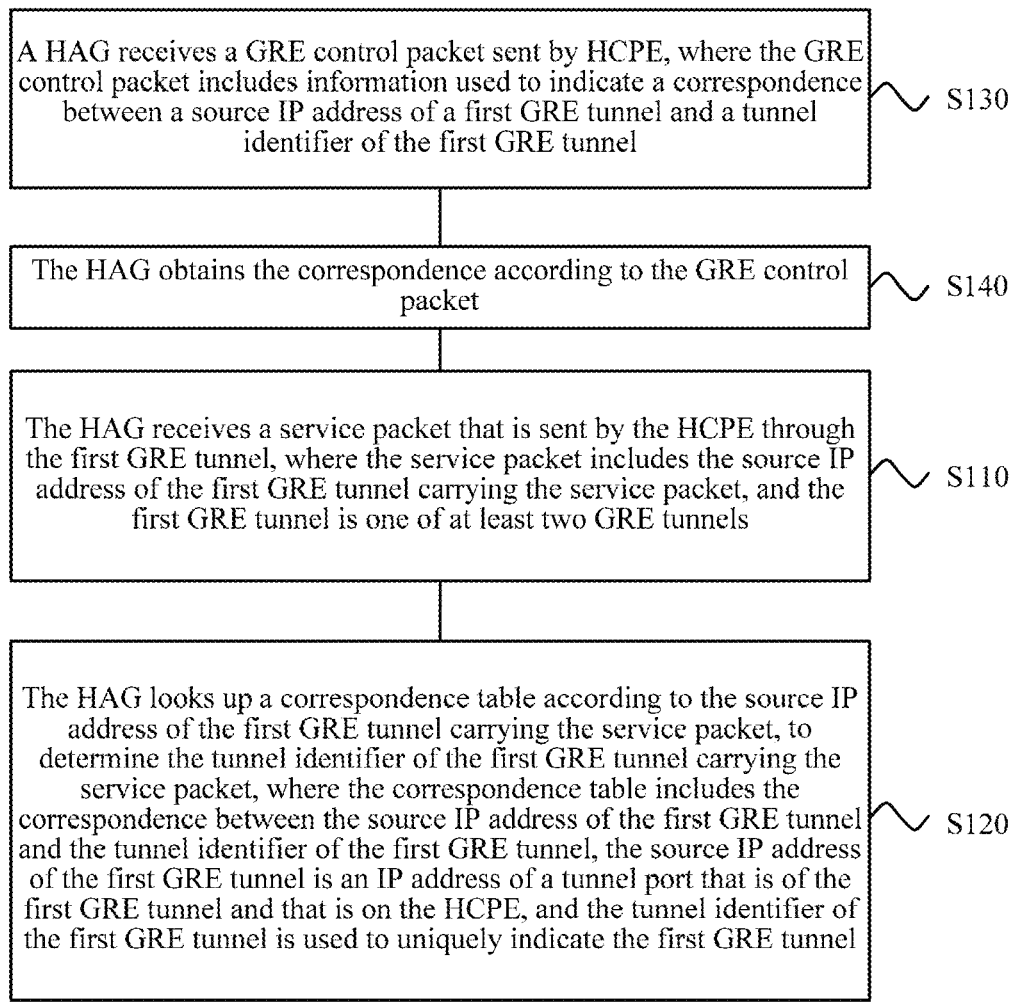
FIG. 3 is another schematic flowchart of a method for determining a GRE tunnel identifier according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding and describing a method provided in an embodiment of the present invention, an application scenario of a method for determining a GRE tunnel identifier provided in an embodiment of the present invention is first described with reference to FIG. 1.

As shown in FIG. 1, a hybrid customer premises equipment HCPE includes a DSL interface and an LTE interface. The HCPE sets up a GRE tunnel (denoted as a first GRE tunnel) of a DSL access network to a hybrid access gateway HAG by using the DSL interface, and sets up a GRE tunnel (denoted as a second GRE tunnel) of an LTE access network to the HAG by using the LTE interface. The first GRE tunnel is bonded (bonding) to the second GRE tunnel to form a hybrid access tunnel.

It should be understood that, the Generic Routing Encapsulation (Generation Routing Encapsulation, "GRE" for short) protocol is an encapsulation protocol, and provides a mechanism for encapsulating a packet of one protocol in a packet of another protocol, so that the packet can be transmitted in a heterogeneous network. Specifically, GRE is to encapsulate data packets of some network protocols (for example, the IP, the IPx, and the Apple Talk), so that these encapsulated data packets can be transmitted in another network layer protocol.

It should further be understood that, service packets of a same service on the HCPE may be separately transmitted to the HAG by using the first GRE tunnel and the second GRE tunnel. Assuming that a bandwidth of the DSL access network (that is, the first GRE tunnel) is 1 G, and a bandwidth of the LTE access network (that is, the second GRE tunnel) is 1 G, after the GRE tunnels are bonded, an access network bandwidth of 2 G can be provided to a user. For example, the HCPE sends service packets of a service to the HAG by using the hybrid access tunnel. When a transmission volume of the first GRE tunnel exceeds the bandwidth of the first GRE tunnel, an exceeding transmission volume is migrated to the second GRE tunnel for transmission. Therefore, compared with each separate GRE tunnel, the hybrid access tunnel formed after the first GRE tunnel is bonded to the second GRE tunnel can provide a higher access network bandwidth to a user, and can improve packet transmission reliability.

It should further be understood that, in a GRE tunnel bonding scenario shown in FIG. 1, the first GRE tunnel and the second GRE tunnel are bonded at an HCPE end and a HAG end, and the HCPE hides the first GRE tunnel and the second GRE tunnel from the user. That is, from the perspective of the user, a separate access network connection tunnel between the HCPE and the HAG is used to transmit data.

In the scenario shown in FIG. 1, after the first GRE tunnel is bonded to the second GRE tunnel, the HAG cannot distinguish a GRE tunnel, of an access network, through which a specific service packet received from the HCPE is received. Currently, an operator urgently needs to resolve the problem.

For the foregoing technical problem, embodiments of the present invention provide a method, a device, and a system for determining a GRE tunnel identifier, so that in a GRE tunnel bonding (GRE tunnel bonding) scenario, a HAG can autonomously and flexibly distinguish, from bonded GRE tunnels, a GRE tunnel through which a service packet is received.

FIG. 2 shows a method 100 for determining a Generic Routing Encapsulation GRE tunnel identifier according to an embodiment of the present invention. The method is applied to a scenario in which there are at least two GRE tunnels between a hybrid access gateway HAG and a hybrid customer premises equipment HCPE and the at least two GRE tunnels are bonded. The method 100 includes the following steps.

S110: The HAG receives a service packet that is sent by the HCPE through a first GRE tunnel, where the service packet includes a source IP address of the first GRE tunnel carrying the service packet, and the first GRE tunnel is one of the at least two GRE tunnels.

S120: The HAG looks up a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

Therefore, in this embodiment of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing operation, administration, and maintenance (Operation Administration and Maintenance, "OAM" for short) on a GRE tunnel can be met.

It should be understood that, a GRE tunnel is determined by using a tunnel source IP address and a tunnel destination IP address, and a direction of the GRE tunnel is from the HCPE to the HAG. The source IP address of the GRE tunnel is an IP address of a tunnel port that is of the GRE tunnel and that is on the HCPE, and the destination IP address is an IP address of a tunnel port that is of the GRE tunnel and that is on the HAG Specifically, as shown in FIG. 1, the source IP address of the first GRE tunnel is an IP address of a DSL interface of the HCPE, and a destination IP address of the first GRE tunnel is an IP address of a tunnel port that is of the first GRE tunnel and that is on the HAG. A source IP address of a second GRE tunnel is an IP address of an LTE interface of the HCPE, and a destination IP address of the second GRE tunnel is an IP address of a tunnel port that is of the second GRE tunnel and that is on the HAG. It should be understood that, the destination IP address of the first GRE tunnel and the destination IP address of the second GRE tunnel may be different or may be the same. This is not limited in this embodiment of the present invention.

Specifically, the HCPE has at least two access network interfaces, the at least two access network interfaces are in a one-to-one correspondence with the at least two GRE tunnels, and the HAG and the HCPE may set up the at least two GRE tunnels by using the following procedure:

1) The HCPE sends, to the HAG by using a first interface of the at least two access network interfaces, a GRE tunnel setup request packet used to request setup of the first GRE tunnel.

2) The HAG sends a GRE tunnel setup accept packet to the HCPE, to respond to the GRE tunnel setup request packet. In this way, the HCPE and the HAG complete setup of the first GRE tunnel.

3) The HCPE sequentially performs step 1) and step 2) at each interface, other than the first interface, of the at least two access network interfaces, so as to complete setup of the at least two GRE tunnels between the HCPE and the HAG It should be understood that, access network types of the at least two GRE tunnels may be different from each other, or some of access network types of the at least two GRE tunnels may be the same. This is not limited in this embodiment of the present invention. For example, the at least two GRE tunnels include the first GRE tunnel based on a DSL access network, the second GRE tunnel based on an LTE access network, and a third GRE tunnel based on a 3G access network. Alternatively, the at least two GRE tunnels include the first GRE tunnel based on a DSL access network, the second GRE tunnel based on an LTE access network, and a third GRE tunnel based on the DSL access network.

It should further be understood that, in this embodiment of the present invention, that the at least two GRE tunnels are bonded means that packets of a same service can be transmitted on the at least two GRE tunnels at the same time. As shown in FIG. 1, the two GRE tunnels based on the DSL and LTE access networks that are set up between the HCPE and the HAG are bonded, and the HCPE can transmit packets of a same service to the HAG by using the two GRE tunnels at the same time.

In this embodiment of the present invention, when access network types of the at least two bonded GRE tunnels are different, a tunnel identifier of a GRE tunnel mentioned in the present invention may be directly an access network type (which may also be referred to as a tunnel type) of the GRE tunnel.

Optionally, in this embodiment of the present invention, access network types of different GRE tunnels of the at least two GRE tunnels are different, and the tunnel identifier of the first GRE tunnel indicates an access network type of the first GRE tunnel.

Specifically, for example, in the scenario shown in FIG. 1, the tunnel identifier of the first GRE tunnel is, for example, a DSL, and a tunnel identifier of the second GRE tunnel is, for example, LTE.

It should be understood that, FIG. 1 is only an example rather than a limitation. An access network type of a GRE tunnel includes a fixed access network and a mobile access network. The fixed access network is, for example, a digital subscriber line (Digital Subscriber Line, DSL) access network, and the mobile access network is, for example, a 3G network, an LTE network, or another mobile access network.

In this embodiment of the present invention, the HAG obtains correspondences between source IP addresses and access network types of the at least two bonded GRE tunnels, and when receiving a service packet, can flexibly determine, according to the correspondences, an access network type of a GRE tunnel carrying the packet. Therefore, in a GRE tunnel bonding scenario, a GRE tunnel through which a service packet is received can be flexibly and efficiently distinguished, so that a current urgent need of an operator can be met.

Specifically, the HAG may obtain correspondences between source IP addresses and tunnel identifiers of the at least two GRE tunnels from an upper layer device (for example, a network management device or a controller). For example, the HCPE reports, to the upper layer device in real time, correspondences between source IP addresses and tunnel identifiers of GRE tunnels that are currently set up to the HAG, and then the upper layer device notifies the HAG of the correspondences. Alternatively, the HAG may directly obtain the correspondences from the HCPE.

Optionally, as shown in FIG. 3, in this embodiment of the present invention, before S110 of receiving, by the HAG, a service packet that is sent by the HCPE through a first GRE tunnel, the method 100 further includes:

S130: The HAG receives a GRE control packet sent by the HCPE, where the GRE control packet includes information used to indicate the correspondence between the source IP address of the first GRE tunnel and the tunnel identifier of the first GRE tunnel.

S140: The HAG obtains the correspondence according to the GRE control packet.

It should be understood that, the GRE control packet is a packet used for performing operations such as setup, bonding, teardown, and OAM management on a GRE tunnel.

For example, a correspondence between a source IP address and a tunnel identifier of a GRE tunnel may be carried in an attribute (Attribute) field of the GRE control packet.

Figure 4A:
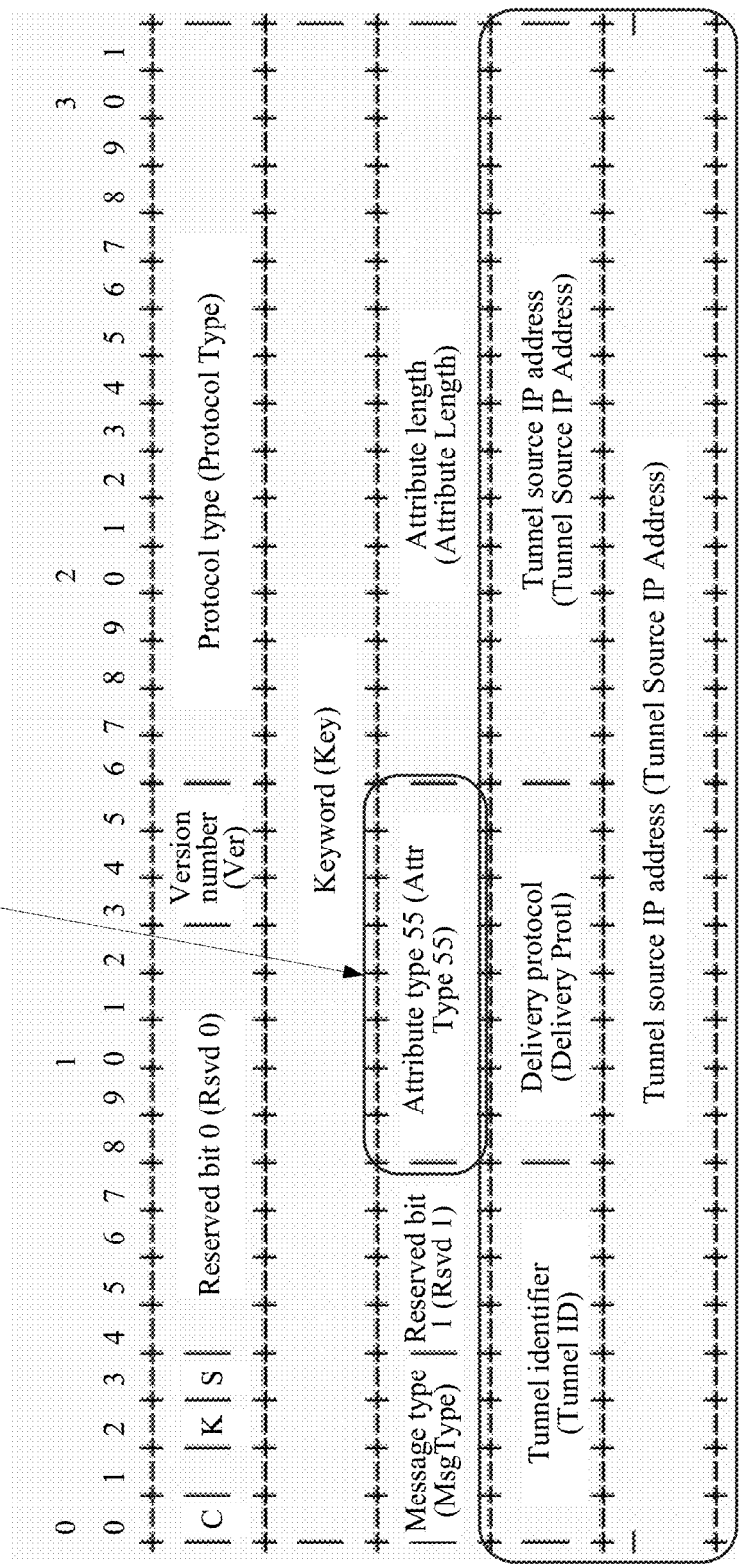
FIG. 4(a), FIG. 4(b), and FIG. 4(c) are schematic diagrams of GRE control packets according to embodiments of the present invention.

Specifically, FIG. 4(a) is a schematic diagram of a packet format of a GRE control packet according to an embodiment of the present invention. The GRE control packet includes a message type (MsgType) field, a reserved bit 1 (Rsvd1) field, and the attribute (Attributes) field. The MsgType field is used to indicate a message type of the GRE control packet, and different values of the MsgType field indicate GRE control packets of different message types. As shown in Table 1, for example, when a value of the MsgType field is 1, it indicates that the GRE control packet is a GRE tunnel setup request packet; when a value of the MsgType field is 2, it indicates that the GRE control packet is a GRE tunnel setup accept packet; or when a value of the MsgType field is 6, it indicates that the GRE control packet is a GRE tunnel notify packet. For a meaning of another value, refer to information shown in Table 1, and details are not described herein. A value of the reserved bit 1 (Rsvd1) field may be 0. The attribute (Attributes) field indicates an attribute of the GRE control packet. As shown in FIG. 4(a), the attribute (Attribute) field specifically includes an attribute type (Attribute Type) field, an attribute length (Attribute Length) field, and an attribute value (Attribute Value) field. The Attribute Type indicates an attribute type of the GRE control packet.

In this embodiment of the present invention, a value of the Attribute Type is an attribute type 55 (Attri Type55), indicating that the attribute type of the GRE control packet is learning of a correspondence between a tunnel source IP address and a tunnel identifier, where the attribute type Attri Type55 may also be referred to as a learning attribute. The attribute length (Attribute Length) field indicates a length of the attribute value (Attribute Value). In this embodiment of the present invention, the attribute value (Attribute Value) field includes a tunnel identifier (Tunnel ID) field, a delivery protocol (Delivery Protl) field, and a tunnel source IP address (Tunnel Source IP Address) field. Different GRE tunnels are indicated by using different values of the tunnel identifier (Tunnel ID). The delivery protocol (Delivery Protl) indicates a delivery protocol of a GRE tunnel. For example, when a value of the Delivery Protl is 0, it indicates that the delivery protocol is IPv4; or when a value of the Delivery Protl is 1, it indicates that the delivery protocol is IPv6. The tunnel source IP address (Tunnel Source IP Address) field indicates a tunnel source IP address of a GRE tunnel. When the delivery protocol is IPv4, the Tunnel Source IP Address field has 4 bytes; or when the delivery protocol is IPv6, the Tunnel Source IP Address field has 16 bytes.

It should be understood that, as shown in FIG. 4(a), in a packet header of the GRE control packet, C indicates Checksum Present, and a value of C is 0; k indicates Key Present, and a value of k is 1; S indicates Sequence Number Present, and a value of S is 0; a version number (Ver) indicates a protocol version number of the GRE control packet; a protocol type (Protocol Type) is used to indicate a protocol type of the GRE control packet; and a keyword (key) field is used as a security parameter, and is used as a multiplexing distributor for the GRE tunnel on the HAG, and the HAG assigns a value to the "key" field and notifies the HCPE of the value.

In this embodiment of the present invention, when access network types of different GRE tunnels of the at least two GRE tunnels that are set up between the HCPE and the HAG are different from each other, a tunnel identifier of each GRE tunnel is directly, for example, an access network type (which may also be referred to as a tunnel type) of each GRE tunnel. The tunnel identifier (Tunnel ID) field of the GRE control packet shown in FIG. 4(a) may alternatively be a tunnel type (Tunnel Type) field. This is not limited in this embodiment of the present invention.

Figure 4B:
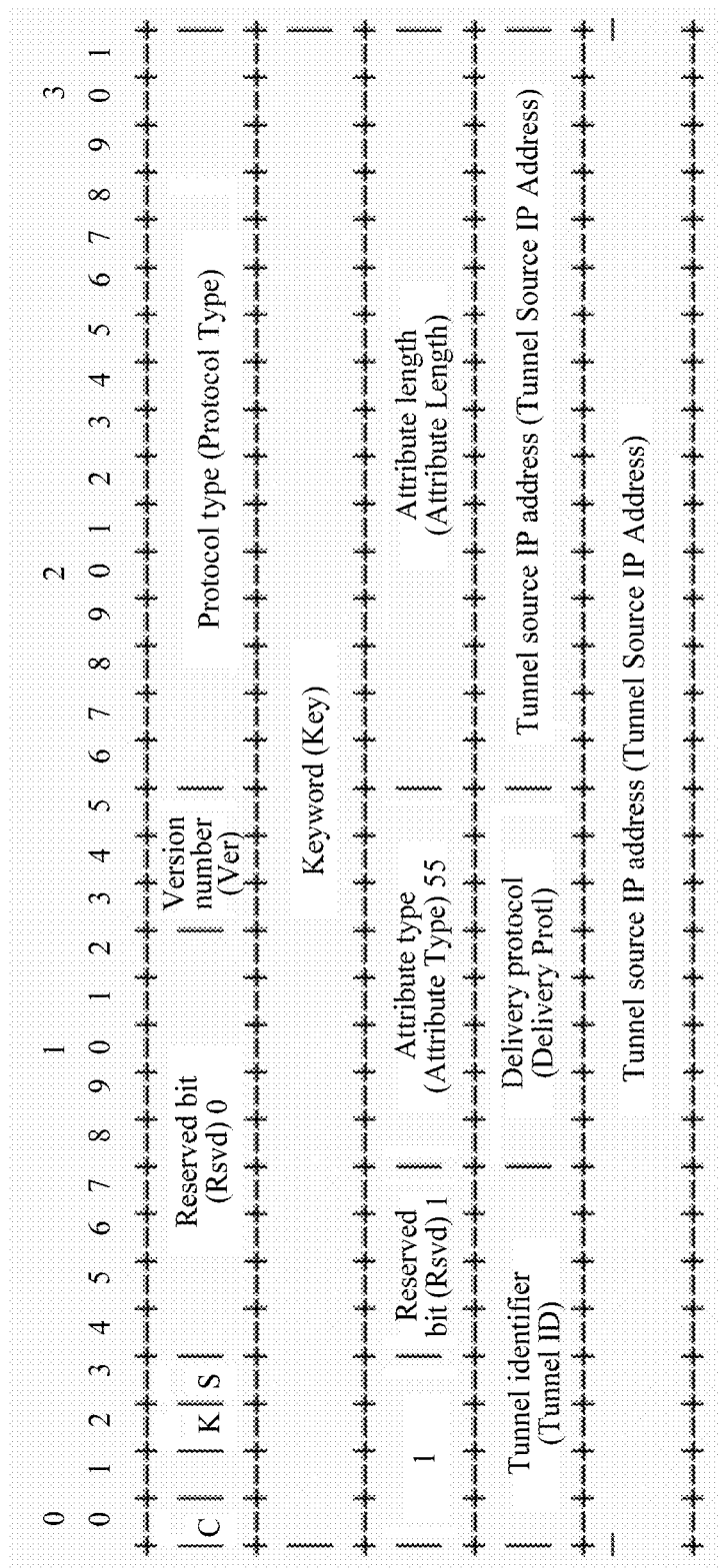
Figure 4C:
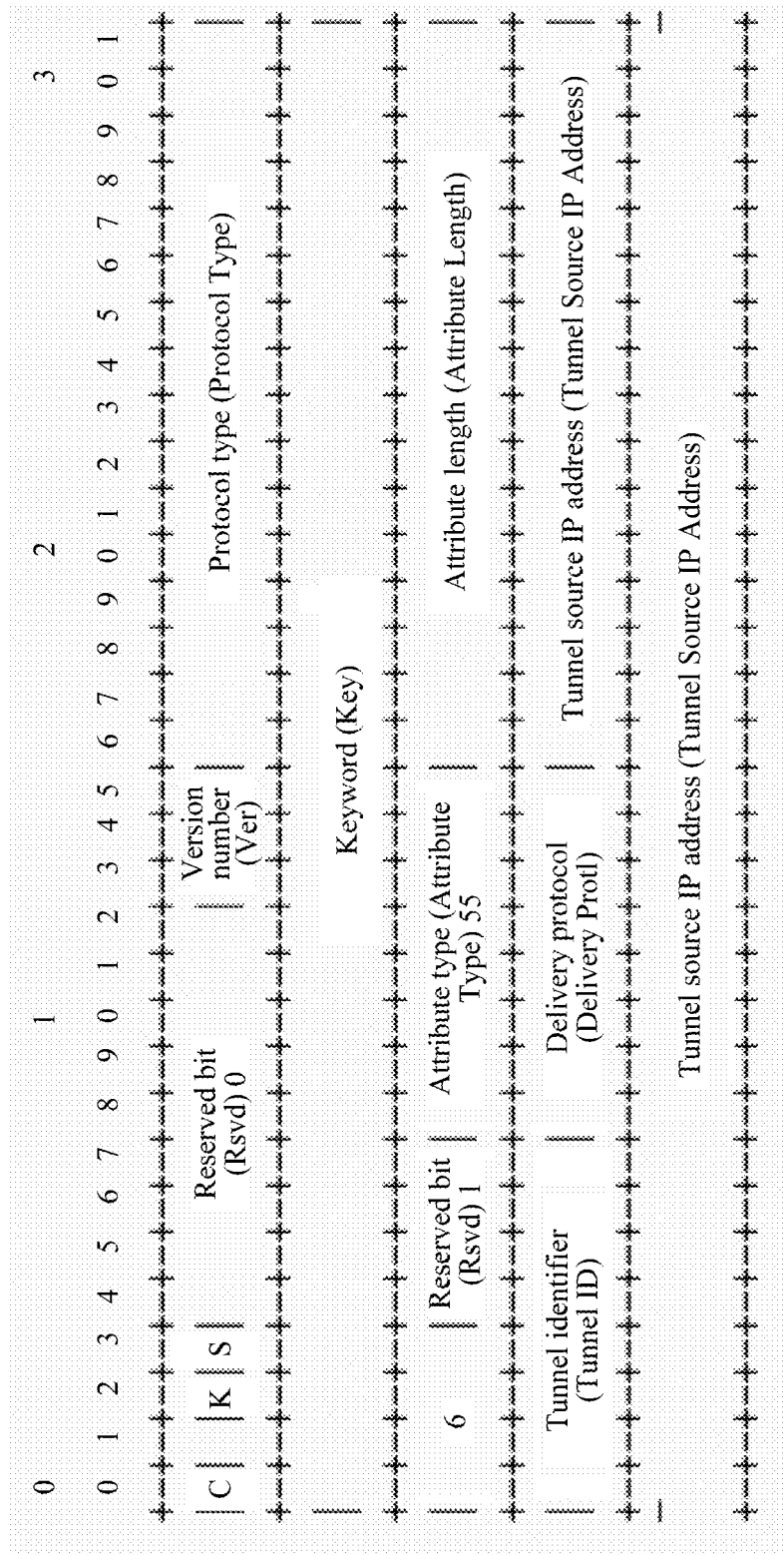

It should be understood that, when the value of the MsgType of the GRE control packet shown in FIG. 4(a) is 1, as shown in FIG. 4(b), it indicates that the GRE control packet is a GRE tunnel setup request packet, and the GRE tunnel setup request packet carries a correspondence between a tunnel identifier and a tunnel source IP address. When the value of the MsgType of the GRE control packet shown in FIG. 4(a) is 6, as shown in FIG. 4(c), it indicates that the GRE control packet is a GRE tunnel notify packet, and the GRE tunnel notify packet carries a correspondence between a tunnel identifier and a tunnel source IP address.

TABLE 1

| MsgType | GRE control packet type |
| --- | --- |
| 1 | GRE Tunnel Setup Request |
| 2 | GRE Tunnel Setup Accept |
| 3 | GRE Tunnel Setup Deny |
| 4 | GRE Tunnel Hello |
| 5 | GRE Tunnel Tear Down |

TABLE 1-continued

| MsgType | GRE control packet type |
|---|---|
| 6 | GRE Tunnel Notify |
| 0, 7 to 15 | Reserved |

In this embodiment of the present invention, the HCPE may notify the HAG of a correspondence between a source IP address and a tunnel identifier of a GRE tunnel based on an existing GRE control packet, so that the HAG can flexibly distinguish, according to the correspondence, a GRE tunnel through which a service packet is received. Compared with an existing procedure, there are no additional signaling overheads.

In S130, specifically, the HCPE may send the correspondence to the HAG by using a GRE tunnel setup request packet in a process of setting up GRE tunnel, or may send the correspondence to the HAG by using a GRE tunnel setup request packet after a GRE tunnel is set up.

Optionally, in this embodiment of the present invention, S130 of receiving, by the HAG, a GRE control packet sent by the HCPE includes:

in a process of setting up the first GRE tunnel, receiving, by the HAG, a GRE tunnel setup request packet sent by the HCPE, where an attribute field of the GRE tunnel setup request packet includes the information used to indicate the correspondence.

Figure 5:
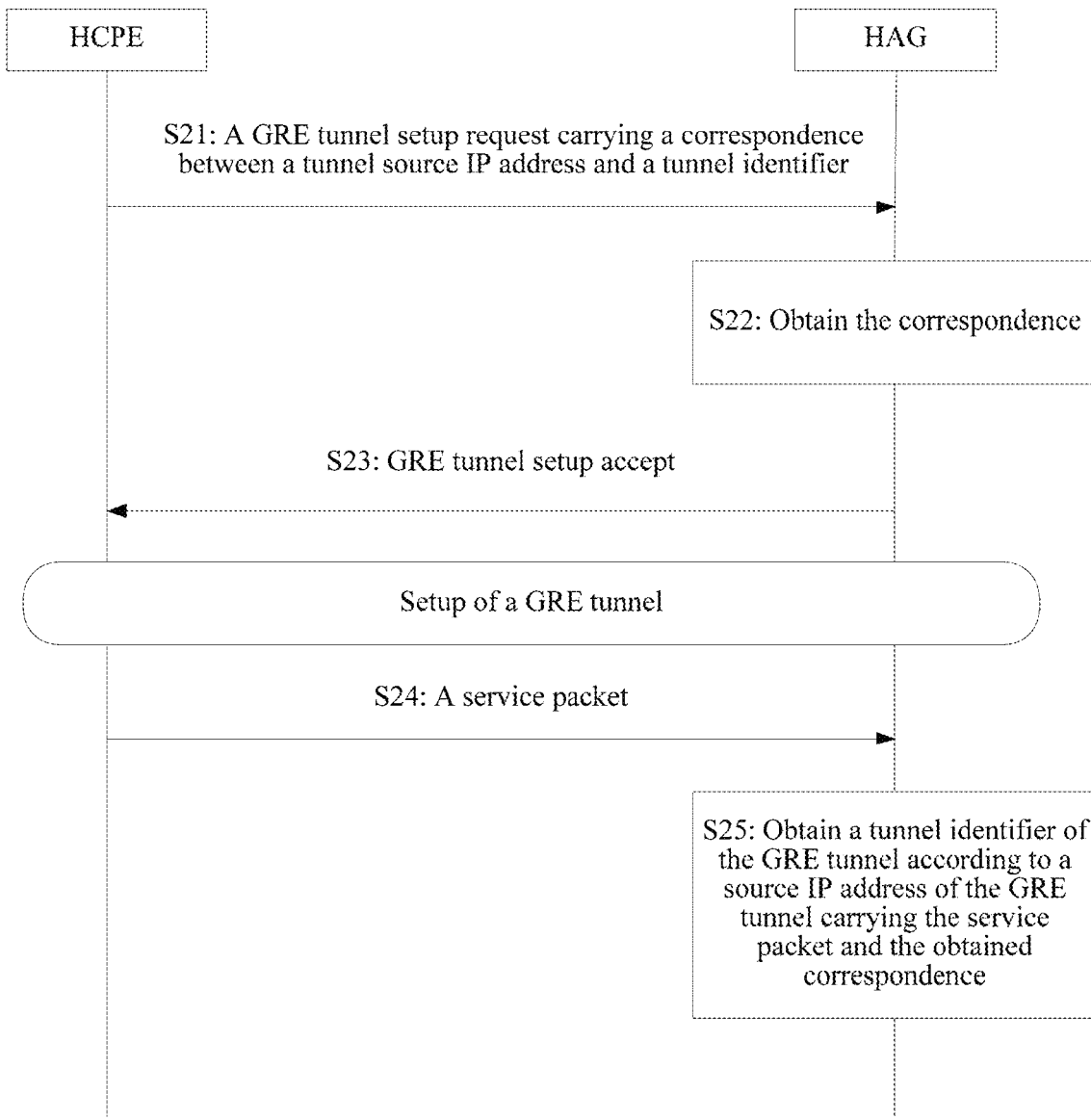
FIG. 5 is still another schematic flowchart of a method for determining a GRE tunnel identifier according to an embodiment of the present invention.

Specifically, FIG. 5 is a schematic flowchart of a solution of notifying, by HCPE, a HAG of a correspondence between a source IP address and a tunnel identifier of a GRE tunnel by using a GRE tunnel setup request packet according to an embodiment of the present invention. As shown in FIG. 5, in S21, the HCPE sends a GRE tunnel setup request packet to the HAG, to request to set up a first GRE tunnel to the HAG, where the GRE tunnel setup request packet includes a correspondence between a tunnel source IP address and a tunnel identifier of the first GRE tunnel. Specifically, a format of the GRE tunnel setup request packet is shown in FIG. 4(b). In S22, the HAG obtains the correspondence between the tunnel source IP address and the tunnel identifier of the first GRE tunnel according to the GRE tunnel setup request packet. In S23, the HAG sends GRE tunnel setup accept packet to the HCPE, to respond to setup of the first GRE tunnel. In S24, the HCPE sends a service packet, for example, "GRE Tunnel Hello" to the HAG by using the first GRE tunnel that is set up, where the service packet carries a source IP address of a GRE tunnel carrying the service packet. In S25, the HAG obtains, according to the received service packet, the source IP address of the GRE Tunnel carrying the service packet, and obtains, according to the correspondence obtained in S22, a tunnel identifier of the GRE tunnel carrying the service packet, so as to learn that the service packet comes from the first GRE tunnel.

It should be understood that, step S21 to step S25 are separately performed on each of at least two GRE tunnels. For example, using the scenario shown in FIG. 1 as an example, the HCPE sends, to the HAG by using a DSL interface, the GRE tunnel setup request packet carrying the source IP address and the tunnel identifier (for example, an access network type DSL of the first GRE tunnel) of the first GRE tunnel, to request to set up the DSL-based first GRE tunnel to the HAG. After receiving the GRE tunnel setup request packet, the HAG obtains the correspondence between the source IP address and the tunnel identifier of the first GRE tunnel, and then the HAG sends the GRE tunnel setup accept packet to the HCPE, to respond to setup of the first GRE tunnel. The HCPE sends, to the HAG by using an LTE interface, a GRE tunnel setup request packet carrying a source IP address and a tunnel identifier (for example, an access network type LTE of a second GRE tunnel) of the second GRE tunnel, to request to set up the second GRE tunnel based on the LTE network to the HAG. After receiving the GRE tunnel setup request packet, the HAG obtains a correspondence between the source IP address and the tunnel identifier of the second GRE tunnel, and then the HAG sends the GRE tunnel setup accept packet to the HCPE, to respond to setup of the second GRE tunnel. The HCPE sends a service packet to the HAG by using the first GRE tunnel and the second GRE tunnel that are bonded. The HAG determines, according to a tunnel source IP address carried in the received service packet and the obtained correspondences, the first GRE tunnel or the second GRE tunnel through which the service packet is received. Specifically, for example, the correspondence obtained by the HAG in S22 is that an IP address 1 corresponds to DSL and that an IP address 2 corresponds to LTE. Assuming that in S24, the source IP address of the tunnel carrying the service packet received by the HAG is the IP address 2, the HAG may determine that the GRE tunnel carrying the service packet is the second GRE tunnel based on an LTE access network.

Therefore, in this embodiment of the present invention, the HCPE may notify the HAG of correspondences between source IP addresses and tunnel identifiers of the at least two bonded GRE tunnels based on an existing GRE control packet, so that the HAG can flexibly distinguish, from the at least two GRE tunnels according to the correspondences, a GRE tunnel through which a service packet is received. Compared with an existing procedure, there are no additional signaling overheads.

Optionally, in this embodiment of the present invention, S130 of receiving, by the HAG, a GRE control packet sent by the HCPE includes:

after the first GRE tunnel is set up, receiving, by the HAG, a first GRE tunnel notify packet sent by the HCPE, where an attribute field of the first GRE tunnel notify packet includes the information used to indicate the correspondence.

Figure 6:
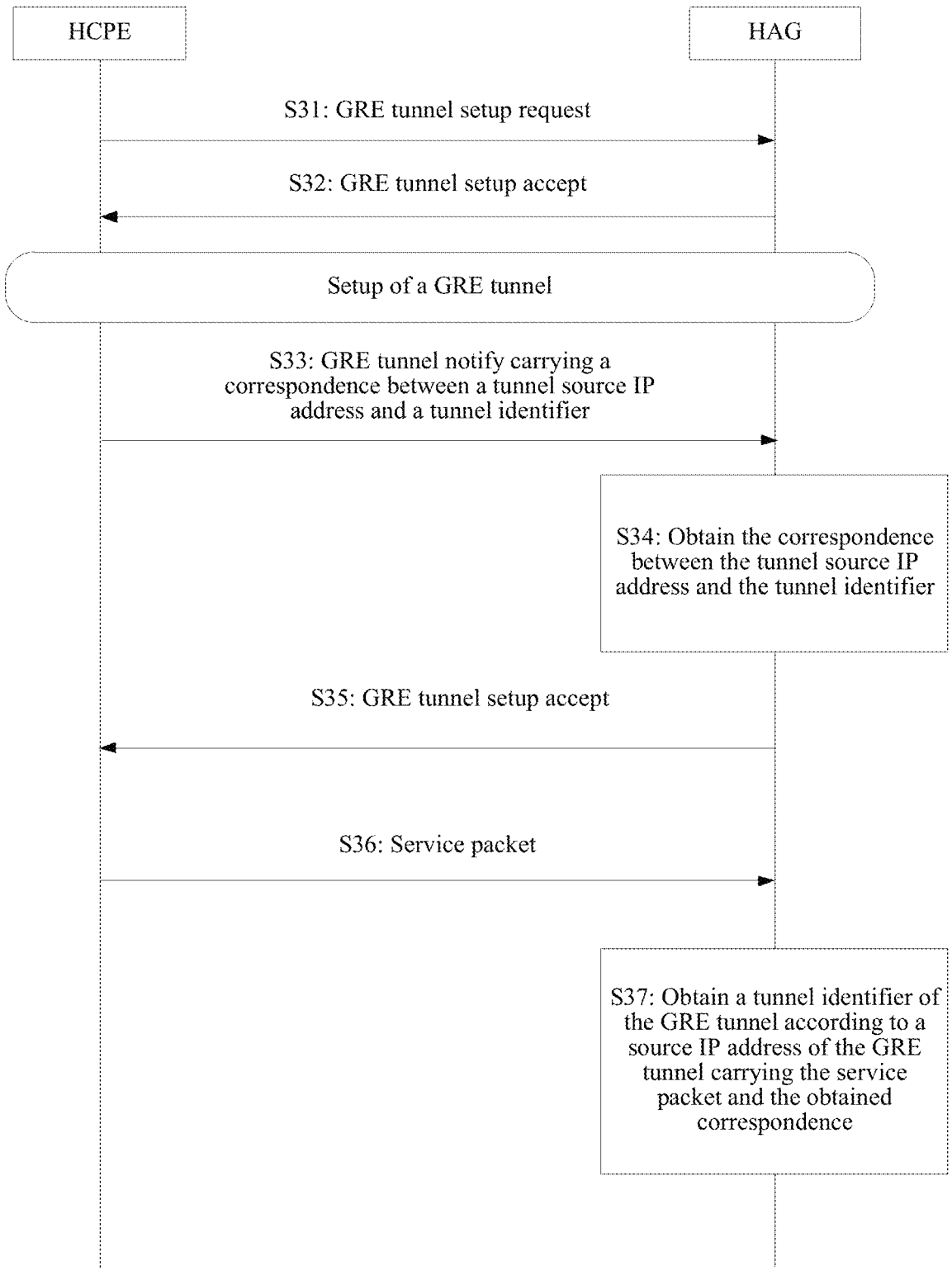
FIG. 6 is still another schematic flowchart of a method for determining a GRE tunnel identifier according to an embodiment of the present invention.

Specifically, FIG. 6 is a schematic flowchart of a solution of actively notifying, by HCPE, a HAG of a correspondence between a source IP address and a tunnel identifier of a GRE tunnel by using a GRE tunnel notify packet according to an embodiment of the present invention. In S31, the HCPE sends a GRE tunnel setup request to the HAG, to request to set up a first GRE tunnel to the HAG, where the GRE Tunnel Setup Request does not carry a correspondence between a tunnel source IP address and a tunnel identifier. In S32, the HAG sends a GRE tunnel setup accept packet to the HCPE, to respond to setup of the first GRE tunnel. In S33, the HCPE sends a GRE tunnel notify packet to the HAG by using the first GRE tunnel, where the GRE tunnel notify packet carries a correspondence between a tunnel source IP address and a tunnel identifier of the first GRE tunnel. Specifically, a format of the GRE tunnel notify packet is shown in FIG. 4(c). In S34, the HAG learns a correspondence between a tunnel type and a tunnel source IP address by using the received GRE tunnel notify packet. In S35, the HAG sends a GRE tunnel setup accept packet to the HCPE as a response, and updates tunnel information, that is, saves the learned correspondence between the tunnel source IP address and the tunnel identifier of the first GRE tunnel. In S36, the HCPE sends a service packet, for example, "GRE Tunnel Hello" to the HAG by using the first GRE tunnel that is set up, where the service packet carries a source IP address of a GRE tunnel carrying the service packet. In S37, the HAG obtains, according to the received service packet, the source IP address of the GRE tunnel carrying the service packet, and obtains, according to the correspondence obtained in S34, a tunnel identifier of the GRE tunnel carrying the service packet, so as to learn, from at least two GRE tunnels, a GRE tunnel through which the service packet comes.

It should be understood that, step S31 to step S37 are performed on each of the at least two GRE tunnels.

Therefore, in this embodiment of the present invention, the HCPE may notify the HAG of correspondences between source IP addresses and tunnel identifiers of the at least two bonded GRE tunnels based on an existing GRE control packet, so that the HAG can flexibly distinguish, from the at least two GRE tunnels according to the correspondences, a GRE tunnel through which a service packet is received. Compared with an existing procedure, there are no additional signaling overheads.

That the HCPE notifies the HAG of correspondences between source IP addresses and tunnel identifiers of the at least two GRE tunnels is described above with reference to FIG. 5 and FIG. 6. Optionally, the HAG may be notified after the HAG sends a request message to the HCPE. This is not limited in this embodiment of the present invention.

Optionally, in this embodiment of the present invention, the method 300 further includes:

in a process of setting up the first GRE tunnel, sending, by the HAG, a GRE tunnel setup accept packet to the HCPE, where the GRE tunnel setup accept packet includes request information used to request the correspondence; and the receiving, by the HAG, a first GRE tunnel notify packet sent by the HCPE includes:

receiving, by the HAG, the first GRE tunnel notify packet that is sent by the HCPE according to the request information.

Figure 7:
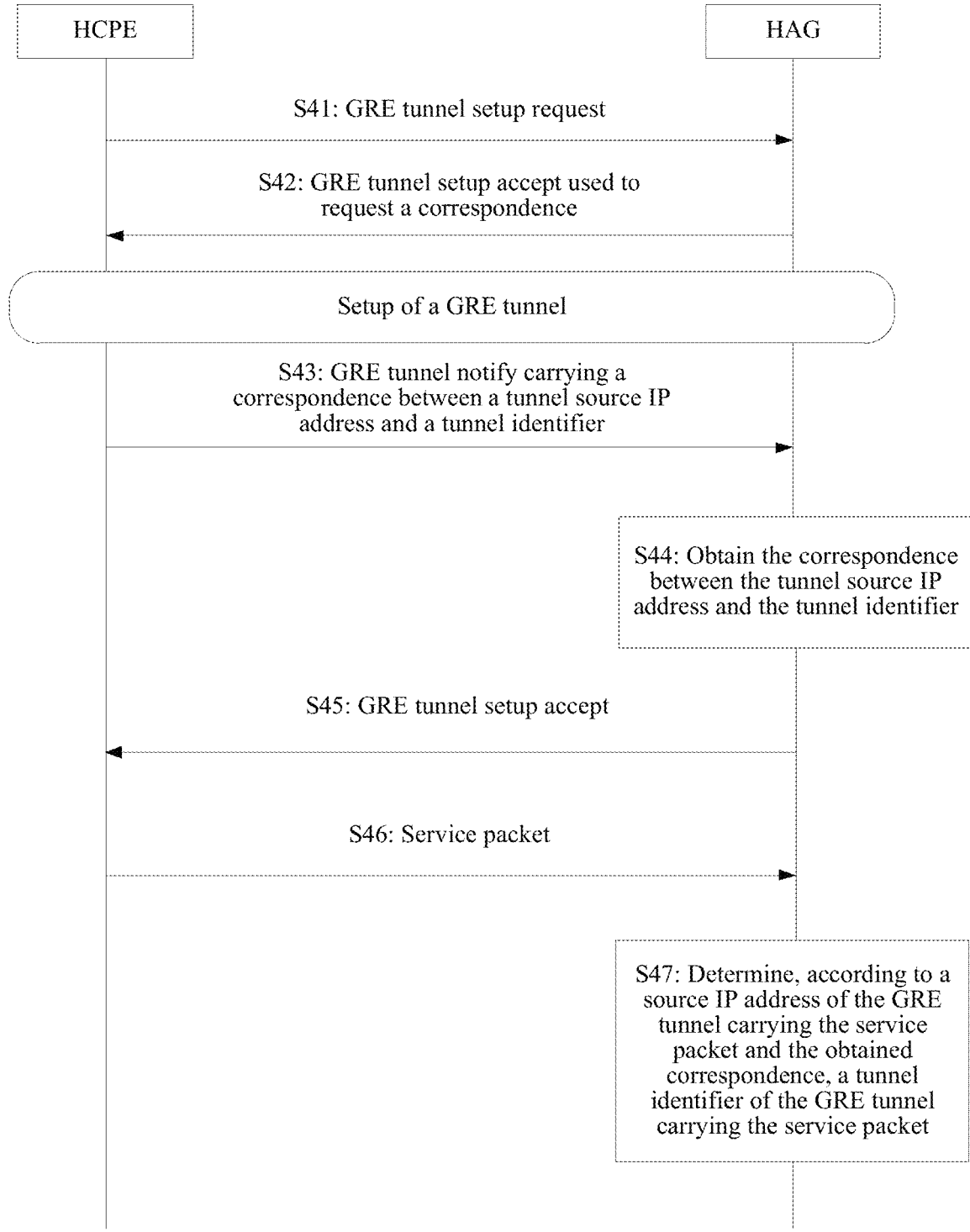
FIG. 7 is still another schematic flowchart of a method for determining a GRE tunnel identifier according to an embodiment of the present invention.

Specifically, FIG. 7 is a schematic flowchart of a solution of requesting, by HCPE, a correspondence between a source IP address and a tunnel identifier of a GRE tunnel from a HAG by using a GRE tunnel setup accept packet according to an embodiment of the present invention. In S41, the HCPE sends a GRE tunnel setup request to the HAG, to request to set up a first GRE tunnel to the HAG, where the GRE Tunnel Setup Request does not carry a correspondence between a tunnel source IP address and a tunnel identifier. In S42, the HAG sends a GRE tunnel setup accept packet to the HCPE, to respond to setup of the first GRE tunnel, and the GRE tunnel setup accept packet is further used to request a correspondence between a source IP address and a tunnel identifier of the first GRE tunnel. Optionally, the GRE tunnel setup accept packet carries the source IP address of the first GRE tunnel. Specifically, a format of the GRE tunnel setup accept packet may be that a value "2" is assigned to the "MsgType" shown in FIG. 4(a), a Tunnel Source IP Address field carries a source IP address of a GRE tunnel, and a Tunnel ID field is empty. In S43, the HCPE sends a GRE tunnel notify packet to the HAG by using the first GRE tunnel, where the GRE tunnel notify packet carries the correspondence between the tunnel source IP address and the tunnel identifier of the first GRE tunnel. Specifically, a format of the GRE tunnel notify packet is shown in FIG. 4(c). In S44, the HAG learns a correspondence between a tunnel type and a tunnel source IP address by using the received GRE tunnel notify packet. In S45, the HAG sends a GRE tunnel setup accept packet to the HCPE as a response, and updates tunnel information, that is, saves the learned correspondence between the tunnel source IP address and the tunnel identifier of the first GRE tunnel. In S46, the HCPE sends a service packet, for example, "GRE Tunnel Hello" to the HAG by using the first GRE tunnel, where the service packet carries a source IP address of a GRE tunnel carrying the service packet. In S47, the HAG obtains, according to the received service packet, the source IP address of the GRE Tunnel carrying the service packet, and obtains, according to the correspondence obtained in S44, a tunnel identifier of the GRE Tunnel carrying the service packet, so as to learn, from at least two GRE tunnels, a GRE tunnel through which the service packet comes.

It should be understood that, step S41 to step S47 are separately performed on each of the at least two GRE tunnels.

Therefore, in this embodiment of the present invention, the HCPE may notify the HAG of correspondences between source IP addresses and tunnel identifiers of the at least two bonded GRE tunnels based on an existing GRE control packet, so that the HAG can flexibly distinguish, from the at least two GRE tunnels according to the correspondences, a GRE tunnel through which a service packet is received. Compared with an existing procedure, there are no additional signaling overheads.

Optionally, in this embodiment of the present invention, the receiving, by the HAG, a first GRE tunnel notify packet sent by the HCPE includes:

sending, by the HAG to the HCPE, a second GRE tunnel notify packet used to request the correspondence; and receiving, by the HAG, the first GRE tunnel notify packet that is sent by the HCPE according to the second GRE tunnel notify packet.

Figure 8:
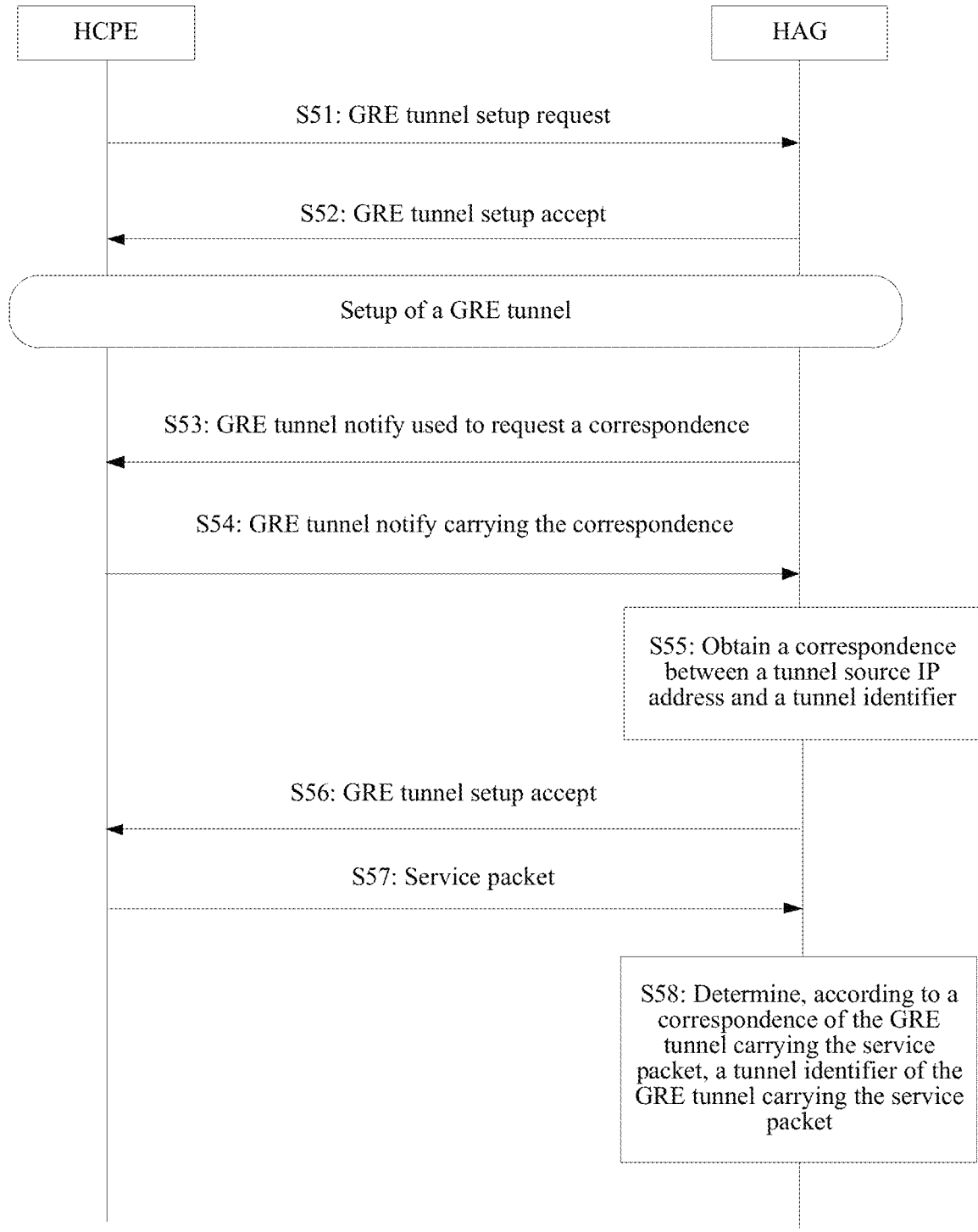
FIG. 8 is still another schematic flowchart of a method for determining a GRE tunnel identifier according to an embodiment of the present invention.

Specifically, FIG. 8 is a schematic flowchart of a solution of requesting, by HCPE, a correspondence between a source IP address and a tunnel type of a GRE tunnel from a HAG by using a GRE tunnel notify packet according to an embodiment of the present invention. In S51, the HCPE sends a GRE tunnel setup request to the HAG, to request to set up a first GRE tunnel to the HAG, where the GRE tunnel setup request does not carry a correspondence between a tunnel source IP address and a tunnel identifier. In S52, the HAG sends a GRE tunnel setup accept packet to the HCPE, to respond to setup of the first GRE tunnel. In S53, the HAG sends, to the HCPE, a GRE tunnel notify packet used to request a correspondence between a source IP address and a tunnel identifier of the first GRE tunnel. Optionally, the GRE tunnel notify packet carries the source IP address of the first GRE tunnel. Specifically, a format of the GRE tunnel notify packet is shown in FIG. 4(c), that is, an Attribute Type of the GRE tunnel notify packet is 55, and a Tunnel Source IP Address field carries a source IP address of a GRE tunnel, but a Tunnel ID field is empty. In S54, the HCPE sends a GRE tunnel notify packet to the HAG by using the first GRE tunnel, where the GRE tunnel notify packet carries the correspondence between the tunnel source IP address and the tunnel identifier of the first GRE tunnel. Specifically, a format of the GRE tunnel notify packet is shown in FIG. 4(c), an Attribute Type is 55, a Tunnel Source IP Address field carries a source IP address of a GRE tunnel, and a Tunnel ID field carries a tunnel type of the GRE tunnel. In S55, the HAG learns a correspondence between a tunnel type and a tunnel source IP address by using the received GRE tunnel notify packet. In S56, the HAG sends a GRE tunnel setup accept packet to the HCPE as a response, and updates tunnel information, that is, stores the learned correspondence. In S57, the HCPE sends a service packet, for example, "GRE Tunnel Hello" to the HAG by using the first GRE tunnel that is set up, where the service packet carries a source IP address of a GRE tunnel carrying the service packet. In S58, the HAG obtains, according to the received service packet, the source IP address of the GRE Tunnel carrying the service packet, and obtains, according to the correspondence obtained in S55, a tunnel identifier of the GRE Tunnel carrying the service packet, so as to learn, from at least two GRE tunnels, a GRE tunnel through which the service packet comes.

It should be understood that, step S51 to step S58 are separately performed on each of the at least two GRE tunnels.

Therefore, in this embodiment of the present invention, the HCPE may notify the HAG of correspondences between source IP addresses and tunnel identifiers of the at least two bonded GRE tunnels based on an existing GRE control packet, so that the HAG can flexibly distinguish, from the at least two GRE tunnels according to the correspondences, a GRE tunnel through which a service packet is received. Compared with an existing procedure, there are no additional signaling overheads.

In the method provided in this embodiment of the present invention, the HAG obtains correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

It should further be understood that, in addition to the Attribute Type 55 shown in FIG. 4, the Attribute Type of the GRE control packet has other numerous values of the Attributes Type, to complete various operations on a GRE control plane. This is the prior art, and details are not described herein.

Figure 9:
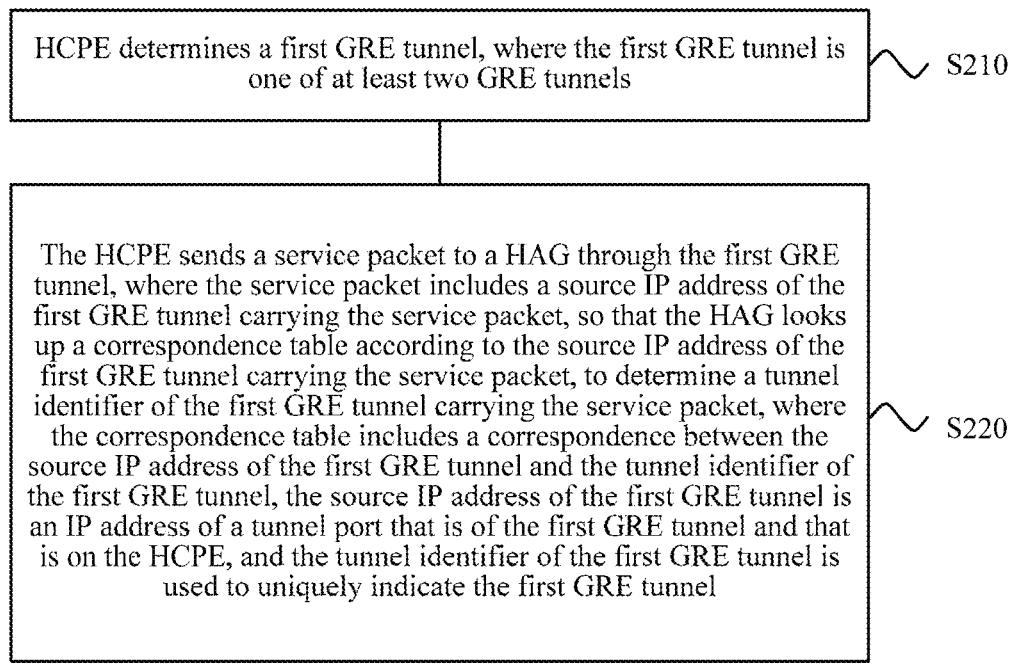
FIG. 9 is still another schematic flowchart of a method for determining a GRE tunnel identifier according to an embodiment of the present invention.

FIG. 9 is a schematic flowchart of a method 200 for determining a GRE tunnel identifier according to an embodiment of the present invention. The solution is described from the perspective of HCPE. The method is applied to a scenario in which there are at least two GRE tunnels between a hybrid access gateway HAG and a hybrid customer premises equipment HCPE and the at least two GRE tunnels are bonded. As shown in FIG. 9, the method 200 includes the following steps.

S210: The HCPE determines a first GRE tunnel, where the first GRE tunnel is one of the at least two GRE tunnels.

S220: The HCPE sends a service packet to the HAG through the first GRE tunnel, where the service packet includes a source IP address of the first GRE tunnel carrying the service packet, so that the HAG looks up a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

Therefore, in the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

In this embodiment of the present invention, when access network types of the at least two bonded GRE tunnels are different, the tunnel identifier of the first GRE tunnel mentioned in the present invention may be directly an access network type (which may also be referred to as a tunnel type) of the first GRE tunnel.

Optionally, in this embodiment of the present invention, access network types of different GRE tunnels of the at least two GRE tunnels are different, and the tunnel identifier of the first GRE tunnel indicates an access network type of the first GRE tunnel.

Specifically, for example, in the scenario shown in FIG. 1, the tunnel identifier of the first GRE tunnel is, for example, a DSL, and a tunnel identifier of a second GRE tunnel is, for example, LTE.

It should be understood that, FIG. 1 is only an example rather than a limitation. An access network type of a GRE tunnel includes a fixed access network and a mobile access network. The fixed access network is, for example, a digital subscriber line (Digital Subscriber Line, DSL) access network, and the mobile access network is, for example, a 3G network, an LTE network, or another mobile access network.

In this embodiment of the present invention, the HAG obtains correspondences between source IP addresses and access network types of the at least two bonded GRE tunnels, and when receiving a service packet, can flexibly determine, according to the correspondences, an access network type of a GRE tunnel carrying the packet. Therefore, in a GRE tunnel bonding scenario, a GRE tunnel through which a service packet is received can be flexibly and efficiently distinguished, so that a current urgent need of an operator can be met.

Optionally, in this embodiment of the present invention, before S220 of sending, by the HCPE, a service packet to the HAG through the first GRE tunnel, the method 200 further includes the following step.

S230: The HCPE sends a GRE control packet to the HAG, where the GRE control packet includes information used to indicate the correspondence between the source IP address of the first GRE tunnel and the tunnel identifier of the first GRE tunnel.

In the present invention, the HCPE may notify the HAG of a correspondence between a source IP address and a tunnel identifier of a GRE tunnel based on an existing GRE control packet, so that the HAG can flexibly distinguish, according to the correspondence, a GRE tunnel through which a service packet is received. Compared with an existing procedure, there are no additional signaling overheads.

In the present invention, the HCPE notifies the HAG of correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

Optionally, in this embodiment of the present invention, S230 of sending, by the HCPE, a GRE control packet to the HAG includes:

in a process of setting up the first GRE tunnel, sending, by the HCPE, a GRE tunnel setup request packet to the HAG, where an attribute field of the GRE tunnel setup request packet includes the information used to indicate the correspondence.

Specifically, for details, refer to descriptions in FIG. 5 above, and details are not described herein.

Optionally, in this embodiment of the present invention, S230 of sending, by the HCPE sends, a GRE control packet to the HAG includes:

after the first GRE tunnel is set up, sending, by the HCPE, a first GRE tunnel notify packet to the HAG, where an attribute field of the first GRE tunnel notify packet includes the information used to indicate the correspondence.

Specifically, for details, refer to descriptions in FIG. 6 above, and details are not described herein.

Optionally, in this embodiment of the present invention, the method 200 further includes:

in a process of setting up the first GRE tunnel, receiving, by the HCPE, a GRE tunnel setup accept packet sent by the HAG, where the GRE tunnel setup accept packet includes request information used to request the correspondence; and the sending, by the HCPE, a first GRE tunnel notify packet to the HAG includes:

sending, by the HCPE, the first GRE tunnel notify packet to the HAG according to the request information.

Specifically, for details, refer to descriptions in FIG. 7 above, and details are not described herein.

Optionally, in this embodiment of the present invention, the sending, by the HCPE, a first GRE tunnel notify packet to the HAG includes:

receiving, by the HCPE, a second GRE tunnel notify packet sent by the HAG and used to request the correspondence; and sending, by the HCPE, the first GRE tunnel notify packet to the HAG according to the second GRE tunnel notify packet.

Specifically, for details, refer to descriptions in FIG. 8 above, and details are not described herein.

Therefore, in this embodiment of the present invention, the HCPE may notify the HAG of correspondences between source IP addresses and tunnel identifiers of the at least two bonded GRE tunnels based on an existing GRE control packet, so that the HAG can flexibly distinguish, from the at least two GRE tunnels according to the correspondences, a GRE tunnel through which a service packet is received. Compared with an existing procedure, there are no additional signaling overheads.

Therefore, in this embodiment of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

Figure 10:
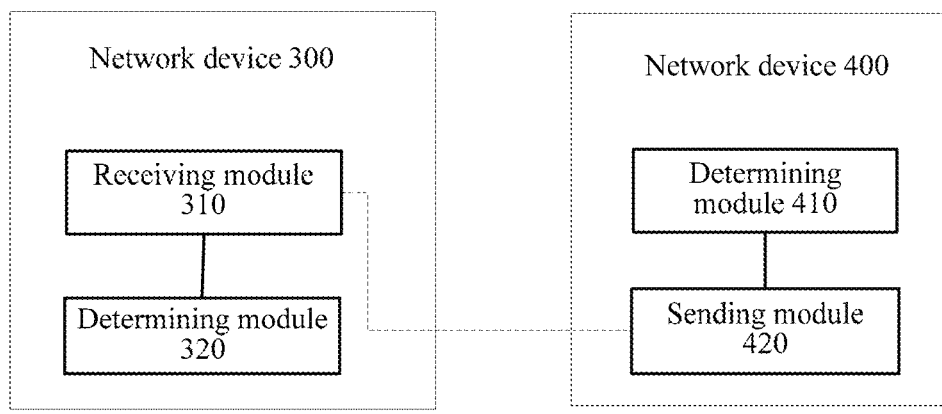
FIG. 10 is a schematic block diagram of a network device according to an embodiment of the present invention.

FIG. 10 is a schematic block diagram of a network device 300 according to an embodiment of the present invention. In a scenario, there are at least two GRE tunnels between the network device 300 and a hybrid customer premises equipment HCPE, and the at least two GRE tunnels are bonded. The network device 300 includes:

a receiving module 310, configured to receive a service packet that is sent by the HCPE through a first GRE tunnel, where the service packet includes a source IP address of the first GRE tunnel carrying the service packet, and the first GRE tunnel is one of the at least two GRE tunnels; and a determining module 320, configured to look up a correspondence table according to the source IP address of the first GRE tunnel carrying the service packet received by the receiving module, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

It should be understood that, the network device 300 according to this embodiment of the present invention may correspond to the HAG in the method for determining a GRE tunnel identifier in the embodiments of the present invention.

Therefore, in this embodiment of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

Optionally, in this embodiment of the present invention, the receiving module 310 is further configured to: before receiving the service packet that is sent by the HCPE through the first GRE tunnel, receive a GRE control packet sent by the HCPE, where the GRE control packet includes information used to indicate the correspondence between the source IP address of the first GRE tunnel and the tunnel identifier of the first GRE tunnel; and the network device 300 further includes:

an obtaining module 330, configured to obtain the correspondence according to the GRE control packet received by the receiving module.

Therefore, in this embodiment of the present invention, the HAG obtains correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

Optionally, in this embodiment of the present invention, the receiving module 310 is configured to: in a process of setting up the first GRE tunnel, receive a GRE tunnel setup request packet sent by the HCPE, where an attribute field of the GRE tunnel setup request packet includes the information used to indicate the correspondence.

Optionally, in this embodiment of the present invention, the receiving module 310 is configured to: after the first GRE tunnel is set up, receive a first GRE tunnel notify packet sent by the HCPE, where an attribute field of the first GRE tunnel notify packet includes the information used to indicate the correspondence.

Optionally, in this embodiment of the present invention, the network device 300 further includes:

a sending module 340, configured to: in a process of setting up the first GRE tunnel, send a GRE tunnel setup accept packet to the HCPE, where the GRE tunnel setup accept packet includes request information used to request the correspondence; and the receiving module 310 is configured to receive the first GRE tunnel notify packet that is sent by the HCPE according to the request information.

Optionally, in this embodiment of the present invention, the receiving module 310 includes:

a sending unit, configured to send, to the HCPE, a second GRE tunnel notify packet used to request the correspondence; and a receiving unit, configured to receive the first GRE tunnel notify packet that is sent by the HCPE according to the second GRE tunnel notify packet sent by the sending unit.

Optionally, in this embodiment of the present invention, access network types of different GRE tunnels of the at least two GRE tunnels are different, and the tunnel identifier of the first GRE tunnel indicates an access network type of the first GRE tunnel.

It should be understood that, the network device 300 according to this embodiment of the present invention may correspond to the HAG in the method for determining a GRE tunnel identifier in the embodiments of the present invention, and the foregoing and other operations and/or functions of modules in the network device 300 are separately for implementing corresponding procedures of the methods in FIG. 1 to FIG. 9. Details are not described herein for brevity.

Therefore, in this embodiment of the present invention, the HAG obtains correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

FIG. 10 is further a schematic block diagram of a network device 400 according to an embodiment of the present invention. In a scenario, there are at least two GRE tunnels between the network device 400 and a hybrid access gateway HAG, and the at least two GRE tunnels are bonded. The network device 400 includes:

a determining module 410, configured to determine a first GRE tunnel, where the first GRE tunnel is one of the at least two GRE tunnels; and a sending module 420, configured to send a service packet to the HAG through the first GRE tunnel determined by the determining module, where the service packet includes a source IP address of the first GRE tunnel carrying the service packet, so that the HAG looks up a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

It should be understood that, the network device 400 corresponds to the HCPE in the method for determining a GRE tunnel identifier provided in the embodiments of the present invention.

Therefore, in this embodiment of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

Optionally, in this embodiment of the present invention, the sending module 420 is further configured to: before sending the service packet to the HAG through the first GRE tunnel, send a GRE control packet to the HAG, where the GRE control packet includes information used to indicate the correspondence between the source IP address of the first GRE tunnel and the tunnel identifier of the first GRE tunnel.

In this embodiment of the present invention, the HCPE notifies the HAG of correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

Optionally, in this embodiment of the present invention, the sending module 420 is configured to: in a process of setting up the first GRE tunnel, send a GRE tunnel setup request packet to the HAG, where an attribute field of the GRE tunnel setup request packet includes the information used to indicate the correspondence.

Optionally, in this embodiment of the present invention, the sending module 420 is configured to: after the first GRE tunnel is set up, send a first GRE tunnel notify packet to the HAG, where an attribute field of the first GRE tunnel notify packet includes the information used to indicate the correspondence.

Optionally, in this embodiment of the present invention, the network device 400 further includes:

a receiving module 430, configured to: in a process of setting up the first GRE tunnel, receive a GRE tunnel setup accept packet sent by the HAG, where the GRE tunnel setup accept packet includes request information used to request the correspondence; and the sending module 420 is configured to send the first GRE tunnel notify packet to the HAG according to the request information.

Optionally, in this embodiment of the present invention, the sending module 420 includes:

a receiving unit, configured to receive a second GRE tunnel notify packet sent by the HAG and used to request the correspondence; and a sending unit, configured to send the first GRE tunnel notify packet to the HAG according to the second GRE tunnel notify packet received by the receiving unit.

Optionally, in this embodiment of the present invention, access network types of different GRE tunnels of the at least two GRE tunnels are different, and the tunnel identifier of the first GRE tunnel indicates an access network type of the first GRE tunnel.

It should be understood that, the network device 400 according to this embodiment of the present invention may correspond to the HCPE in the method for determining a GRE tunnel identifier in the embodiments of the present invention, and the foregoing and other operations and/or functions of modules in the network device 400 are separately for implementing corresponding procedures of the methods in FIG. 1 to FIG. 9. Details are not described herein for brevity.

In this embodiment of the present invention, the HCPE notifies the HAG of correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

Figure 11:
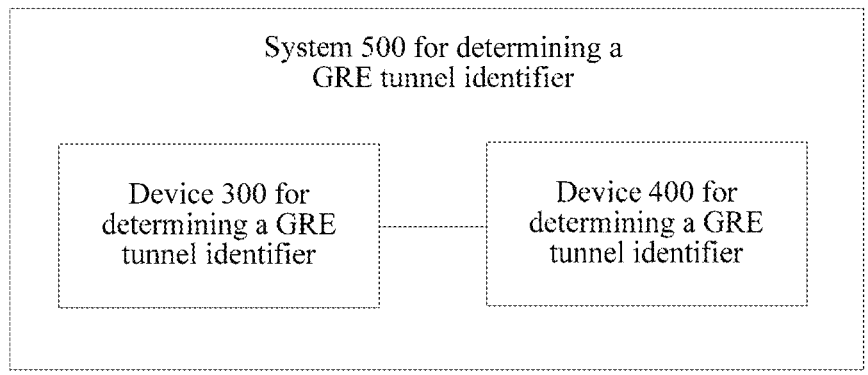
FIG. 11 is a schematic block diagram of a system for determining a GRE tunnel identifier according to an embodiment of the present invention.

FIG. 11 shows a system 500 for determining a Generic Routing Encapsulation GRE tunnel identifier according to an embodiment of the present invention. The system 500 includes the network device 300 provided in the embodiments of the present invention and the network device 400 provided in the embodiments of the present invention.

It should be understood that, the network device 300 corresponds to the HAG in the method for determining a GRE tunnel identifier in the embodiments of the present invention, the network device 400 corresponds to the HCPE in the method for determining a GRE tunnel identifier in the embodiments of the present invention, and the foregoing and other operations and/or functions of modules in the system 500 are separately for implementing corresponding procedures of the methods in FIG. 1 to FIG. 9. Details are not described herein for brevity.

Therefore, in this embodiment of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

Figure 12:
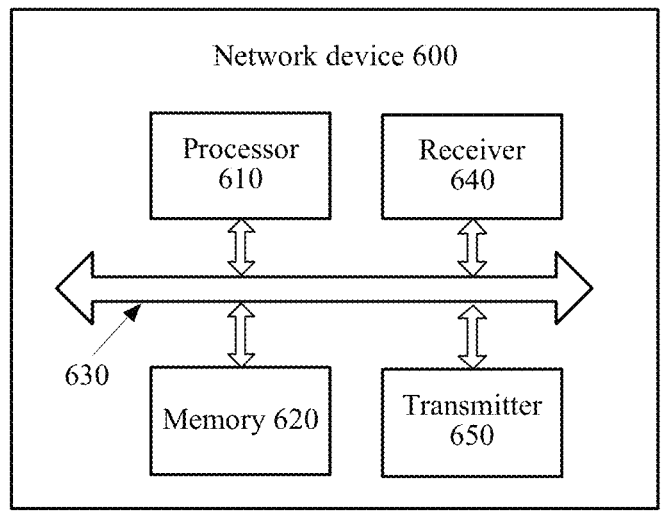
FIG. 12 is a schematic block diagram of a network device according to another embodiment of the present invention.

As shown in FIG. 12, an embodiment of the present invention further provides a network device 600. In a scenario, there are at least two GRE tunnels between the network device 600 and a hybrid customer premises equipment HCPE, and the at least two GRE tunnels are bonded. The network device 600 includes a processor 610, a memory 620, a bus system 630, a receiver 640, and a transmitter 650. The processor 610, the memory 620, the receiver 640, and the transmitter 650 are connected by using the bus system 630. The memory 620 is configured to store an instruction. The processor 610 is configured to execute the instruction stored in the memory 620, to control the receiver 640 to receive a signal, and control the transmitter 650 to send a signal. The receiver 640 is configured to receive a service packet that is sent by the HCPE through a first GRE tunnel, where the service packet includes a source IP address of the first GRE tunnel carrying the service packet, and the first GRE tunnel is one of the at least two GRE tunnels.

The processor 610 is configured to look up a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

It should be understood that, the network device 600 according to this embodiment of the present invention may correspond to the HAG in the method for determining a GRE tunnel identifier in the embodiments of the present invention.

Therefore, in this embodiment of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

Optionally, in this embodiment of the present invention, the receiver 640 is configured to: before receiving the service packet that is sent by the HCPE through the first GRE tunnel, receive a GRE control packet sent by the HCPE, where the GRE control packet includes information used to indicate the correspondence between the source IP address of the first GRE tunnel and the tunnel identifier of the first GRE tunnel.

The processor 610 is configured to obtain the correspondence according to the GRE control packet.

Therefore, in this embodiment of the present invention, the HAG obtains correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

Optionally, in this embodiment of the present invention, the receiver 640 is configured to: in a process of setting up the first GRE tunnel, receive a GRE tunnel setup request packet sent by the HCPE, where an attribute field of the GRE tunnel setup request packet includes the information used to indicate the correspondence.

Optionally, in this embodiment of the present invention, the receiver 640 is configured to: after the first GRE tunnel is set up, receive a first GRE tunnel notify packet sent by the HCPE, where an attribute field of the first GRE tunnel notify packet includes the information used to indicate the correspondence.

Optionally, in this embodiment of the present invention, the transmitter 650 is configured to: in a process of setting up the first GRE tunnel, send a GRE tunnel setup accept packet to the HCPE, where the GRE tunnel setup accept packet includes request information used to request the correspondence; and the receiver 640 is configured to receive the first GRE tunnel notify packet that is sent by the HCPE according to the request information.

Optionally, in this embodiment of the present invention, the transmitter 650 is configured to send, to the HCPE, a second GRE tunnel notify packet used to request the correspondence; and the receiver 640 is configured to receive the first GRE tunnel notify packet that is sent by the HCPE according to the second GRE tunnel notify packet.

Optionally, in this embodiment of the present invention, access network types of different GRE tunnels of the at least two GRE tunnels are different, and the tunnel identifier of the first GRE tunnel indicates an access network type of the first GRE tunnel.

It should be understood that, in this embodiment of the present invention, the processor 610 may be a central processing unit (Central Processing Unit, "CPU" for short), and the processor 610 may alternatively be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor or the like.

The memory 620 may include a read-only memory and a random access memory, and provides an instruction and data to the processor 610. A part of the memory 620 may further include a non-volatile random access memory. For example, the memory 620 may further store device type information.

The bus system 630 may include a power bus, a control bus, a status signal bus, and the like in addition to a data bus. However, for clear description, various types of buses in the figure are marked as the bus system 630.

In an implementation process, steps of the foregoing method may be implemented by a hardware integrated logic circuit in the processor 610 or by an instruction in a software form. Steps of the methods disclosed with reference to the embodiments of the present invention may be directly embodied as being executed by a hardware processor or by a combination of hardware in the processor and software modules. The software module may be located in a mature storage medium in the field, such as a random access memory, a flash memory, a read-only memory, a programmable read-only memory, an electrically-erasable programmable read-only memory, or a register. The storage medium is located in the memory 620, and the processor 610 reads information in the memory 620 and completes the steps in the foregoing method in combination with hardware of the processor 610. To avoid repetition, details are not described herein.

It should be understood that, the network device 600 according to this embodiment of the present invention may correspond to the HAG in the method for determining a GRE tunnel identifier in the embodiments of the present invention and also correspond to the network device 300 in the embodiments of the present invention, and the foregoing and other operations and/or functions of modules in the network device 600 are separately for implementing corresponding procedures of the methods in FIG. 1 to FIG. 9. Details are not described herein for brevity.

Therefore, in this embodiment of the present invention, the HAG obtains correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

Figure 13:
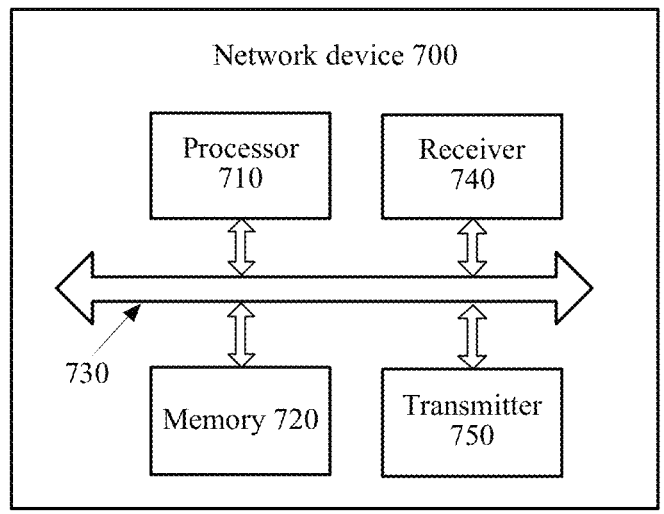
FIG. 13 is another schematic block diagram of a network device according to another embodiment of the present invention.

As shown in FIG. 13, an embodiment of the present invention further provides a network device 700. In a scenario, there are at least two GRE tunnels between the network device 700 and a hybrid access gateway HAG, and the at least two GRE tunnels are bonded. The network device 700 includes a processor 710, a memory 720, a bus system 730, a receiver 740, and a transmitter 750. The processor 710, the memory 720, the receiver 740, and the transmitter 750 are connected by using the bus system 730. The memory 720 is configured to store an instruction. The processor 710 is configured to execute the instruction stored in the memory 720, to control the receiver 740 to receive a signal, and control the transmitter 750 to send a signal. The processor 710 is configured to determine a first GRE tunnel, where the first GRE tunnel is one of the at least two GRE tunnels. The transmitter 750 is configured to send a service packet to the HAG through the first GRE tunnel, where the service packet includes a source IP address of the first GRE tunnel carrying the service packet, so that the HAG looks up a correspondence table according to the source IP address of the first GRE tunnel carrying the service packet, to determine a tunnel identifier of the first GRE tunnel carrying the service packet, where the correspondence table includes a correspondence between the source IP address of the first GRE tunnel and the tunnel identifier of the first GRE tunnel, the source IP address of the first GRE tunnel is an IP address of a tunnel port that is of the first GRE tunnel and that is on the HCPE, and the tunnel identifier of the first GRE tunnel is used to uniquely indicate the first GRE tunnel.

It should be understood that, the network device 700 may correspond to the HCPE in the method for determining a GRE tunnel identifier provided in the embodiments of the present invention.

Therefore, in this embodiment of the present invention, in a GRE tunnel bonding scenario, the HAG can flexibly and efficiently distinguish, according to a correspondence between a source IP address and a tunnel identifier of a GRE tunnel, a GRE tunnel through which a service packet is received, so that a current requirement of an operator for performing OAM on a GRE tunnel can be met.

Optionally, in this embodiment of the present invention, the transmitter 750 is configured to: before sending the service packet to the HAG through the first GRE tunnel, send a GRE control packet to the HAG, where the GRE control packet includes information used to indicate the correspondence between the source IP address of the first GRE tunnel and the tunnel identifier of the first GRE tunnel.

In this embodiment of the present invention, the HCPE notifies the HAG of correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

Optionally, in this embodiment of the present invention, the transmitter 750 is configured to: in a process of setting up the first GRE tunnel, send a GRE tunnel setup request packet to the HAG, where an attribute field of the GRE tunnel setup request packet includes the information used to indicate the correspondence.

Optionally, in this embodiment of the present invention, the transmitter 750 is configured to: after the first GRE tunnel is set up, send a first GRE tunnel notify packet to the HAG, where an attribute field of the first GRE tunnel notify packet includes the information used to indicate the correspondence.

Optionally, in this embodiment of the present invention, the receiver 740 is configured to: in a process of setting up the first GRE tunnel, receive a GRE tunnel setup accept packet sent by the HAG, where the GRE tunnel setup accept packet includes request information used to request the correspondence; and the transmitter 750 is configured to send the first GRE tunnel notify packet to the HAG according to the request information.

Optionally, in this embodiment of the present invention, the receiver 740 is configured to receive a second GRE tunnel notify packet sent by the HAG and used to request the correspondence; and the transmitter 750 is configured to send the first GRE tunnel notify packet to the HAG according to the second GRE tunnel notify packet.

Optionally, in this embodiment of the present invention, access network types of different GRE tunnels of the at least two GRE tunnels are different, and the tunnel identifier of the first GRE tunnel indicates an access network type of the first GRE tunnel.

It should be understood that, in this embodiment of the present invention, the processor 710 may be a central processing unit (Central Processing Unit, "CPU" for short), and the processor 710 may alternatively be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or the processor may be any conventional processor or the like.

The memory 720 may include a read-only memory and a random access memory, and provides an instruction and data to the processor 710. A part of the memory 720 may further include a non-volatile random access memory. For example, the memory 720 may further store device type information.

The bus system 730 may include a power bus, a control bus, a status signal bus, and the like in addition to a data bus. However, for clear description, various types of buses in the figure are marked as the bus system 730.

In an implementation process, steps of the foregoing method may be implemented by a hardware integrated logic circuit in the processor 710 or by an instruction in a software form. Steps of the methods disclosed with reference to the embodiments of the present invention may be directly embodied as being executed by a hardware processor or by a combination of hardware in the processor and software modules. The software module may be located in a mature storage medium in the field, such as a random access memory, a flash memory, a read-only memory, a programmable read-only memory, an electrically-erasable programmable memory, or a register. The storage medium is located in the memory 720, and the processor 710 reads information in the memory 720 and completes the steps in the foregoing method in combination with hardware of the processor 710. To avoid repetition, details are not described herein.

It should be understood that, the network device 700 according to this embodiment of the present invention may correspond to the HCPE in the method for determining a GRE tunnel identifier in the embodiments of the present invention and also correspond to the network device 400 in the embodiments of the present invention, and the foregoing and other operations and/or functions of modules in the network device 700 are separately for implementing corresponding procedures of the methods in FIG. 1 to FIG. 9. Details are not described herein for brevity.

In this embodiment of the present invention, the HCPE notifies the HAG of correspondences between source IP addresses and tunnel identifiers of the at least two bonded GRE tunnels, so that the HAG can flexibly distinguish, from the at least two GRE tunnels according to the correspondences, a GRE tunnel through which a service packet is received. Therefore, according to the method provided in the present invention, in a GRE tunnel bonding scenario, a GRE tunnel through which a service packet is received can be flexibly and efficiently distinguished, so that a current requirement of an operator for performing OAM on a GRE tunnel can be met.

It should further be understood that, the numbers such as first and second used in this specification are merely for distinguishing for convenience description, and are not used to limit the scope of the embodiments of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a Generic Routing Encapsulation (GRE) tunnel identifier, wherein the method is applied to a scenario in which there are at least two GRE tunnels between a hybrid access gateway (HAG) and a hybrid customer premises equipment (HCPE) and the at least two GRE tunnels are bonded, the method comprises:
   receiving, by the HAG, a service packet that is sent by the HCPE through a first GRE tunnel, wherein the service packet comprises a source IP address of the first GRE tunnel carrying the service packet, and the first GRE tunnel is one of the at least two GRE tunnels; and
   looking up, by the HAG, a correspondence table according to the source IP address of the first GRE tunnel carrying the service packet, to determine a tunnel identifier of the first GRE tunnel carrying the service packet, wherein the correspondence table comprises a correspondence between the source IP address of the first GRE tunnel and the tunnel identifier of the first GRE tunnel, and the tunnel identifier of the first GRE tunnel uniquely indicates the first GRE tunnel.

2. The method according to claim 1, wherein before the receiving, by the HAG, a service packet that is sent by the HCPE through a first GRE tunnel, the method further comprises:
   receiving, by the HAG, a GRE control packet sent by the HCPE, wherein the GRE control packet comprises information indicating the correspondence between the source IP address of the first GRE tunnel and the tunnel identifier of the first GRE tunnel; and
   obtaining, by the HAG, the correspondence according to the GRE control packet.

3. The method according to claim 2, wherein receiving, by the HAG, the GRE control packet sent by the HCPE comprises:
   in a process of setting up the first GRE tunnel, receiving, by the HAG, a GRE tunnel setup request packet sent by the HCPE, wherein an attribute field of the GRE tunnel setup request packet comprises the information used to indicate the correspondence.

4. The method according to claim 2, wherein receiving, by the HAG, the GRE control packet sent by the HCPE comprises:
   after the first GRE tunnel is set up, receiving, by the HAG, a first GRE tunnel notify packet sent by the HCPE, wherein an attribute field of the first GRE tunnel notify packet comprises the information used to indicate the correspondence.

5. The method according to claim 4, wherein the method further comprises:
   in a process of setting up the first GRE tunnel, sending, by the HAG, a GRE tunnel setup accept packet to the HCPE, wherein the GRE tunnel setup accept packet comprises request information used to request the correspondence; and
   wherein receiving, by the HAG, the first GRE tunnel notify packet sent by the HCPE comprises:
   receiving, by the HAG, the first GRE tunnel notify packet that is sent by the HCPE according to the request information.

6. The method according to claim 4, wherein receiving, by the HAG, the first GRE tunnel notify packet sent by the HCPE comprises:
   sending, by the HAG to the HCPE, a second GRE tunnel notify packet used to request the correspondence; and
   receiving, by the HAG, the first GRE tunnel notify packet that is sent by the HCPE according to the second GRE tunnel notify packet.

7. The method according to claim 1, wherein access network types of different GRE tunnels of the at least two GRE tunnels are different, and the tunnel identifier of the first GRE tunnel indicates an access network type of the first GRE tunnel.

8. A method for determining a Generic Routing Encapsulation (GRE) tunnel identifier, wherein the method is applied to a scenario in which there are at least two GRE tunnels between a hybrid access gateway (HAG) and a hybrid customer premises equipment (HCPE) and the at least two GRE tunnels are bonded, and the method comprises:
   determining, by the HCPE, a first GRE tunnel, wherein the first GRE tunnel is one of the at least two GRE tunnels; and
   sending, by the HCPE, a service packet to the HAG through the first GRE tunnel, wherein the service packet comprises a source IP address of the first GRE tunnel carrying the service packet, so that the HAG looks up a correspondence table according to the source IP address of the first GRE tunnel carrying the service packet, to determine a tunnel identifier of the first GRE tunnel carrying the service packet, wherein the correspondence table comprises a correspondence between the source IP address of the first GRE tunnel and the tunnel identifier of the first GRE tunnel, and the tunnel identifier of the first GRE tunnel uniquely indicates the first GRE tunnel.

9. The method according to claim 8, wherein before sending, by the HCPE, the service packet to the HAG through the first GRE tunnel, the method further comprises:
sending, by the HCPE, a GRE control packet to the HAG, wherein the GRE control packet comprises information indicates the correspondence between the source IP address of the first GRE tunnel and the tunnel identifier of the first GRE tunnel.

10. The method according to claim 9, wherein sending, by the HCPE, the GRE control packet to the HAG comprises:
in a process of setting up the first GRE tunnel, sending, by the HCPE, a GRE tunnel setup request packet to the HAG, wherein an attribute field of the GRE tunnel setup request packet comprises the information used to indicate the correspondence.

11. The method according to claim 9, wherein sending, by the HCPE, the GRE control packet to the HAG comprises:
after the first GRE tunnel is set up, sending, by the HCPE, a first GRE tunnel notify packet to the HAG, wherein an attribute field of the first GRE tunnel notify packet comprises the information used to indicate the correspondence.

12. The method according to claim 11, wherein the method further comprises:
in a process of setting up the first GRE tunnel, receiving, by the HCPE, a GRE tunnel setup accept packet sent by the HAG, wherein the GRE tunnel setup accept packet comprises request information requesting the correspondence; and
sending, by the HCPE, the first GRE tunnel notify packet to the HAG comprises:
sending, by the HCPE, the first GRE tunnel notify packet to the HAG according to the request information.

13. The method according to claim 11, wherein sending, by the HCPE, the first GRE tunnel notify packet to the HAG comprises:
receiving, by the HCPE, a second GRE tunnel notify packet sent by the HAG for requesting the correspondence; and
sending, by the HCPE, the first GRE tunnel notify packet to the HAG according to the second GRE tunnel notify packet.

14. The method according to claim 8, wherein access network types of different GRE tunnels of the at least two GRE tunnels are different, and the tunnel identifier of the first GRE tunnel indicates an access network type of the first GRE tunnel.

15. A network device, wherein in a scenario in which there are at least two GRE tunnels between the network device and a hybrid customer premises equipment (HCPE) and the at least two (GRE) tunnels are bonded, the network device comprises a memory comprising instructions, and one or more processors coupled to the memory and configured to execute the instructions to cause the network device to:
receive a service packet that is sent by the HCPE through a first GRE tunnel, wherein the service packet comprises a source IP address of the first GRE tunnel carrying the service packet, and the first GRE tunnel is one of the at least two GRE tunnels; and
look up a correspondence table according to the source IP address of the first GRE tunnel carrying the service packet, to determine a tunnel identifier of the first GRE tunnel carrying the service packet, wherein the correspondence table comprises a correspondence between the source IP address of the first GRE tunnel and the tunnel identifier of the first GRE tunnel, and the tunnel identifier of the first GRE tunnel uniquely indicates the first GRE tunnel.

16. The network device according to claim 15, wherein the network device is further caused to:
before receiving the service packet that is sent by the HCPE through the first GRE tunnel, receive a GRE control packet sent by the HCPE, wherein the GRE control packet comprises information indicating the correspondence between the source IP address of the first GRE tunnel and the tunnel identifier of the first GRE tunnel; and
obtain the correspondence according to the GRE control packet received.

17. The network device according to claim 16, wherein the one or more processors are further configured to execute the instructions to cause the network device to:
in a process of setting up the first GRE tunnel, receive a GRE tunnel setup request packet sent by the HCPE, wherein an attribute field of the GRE tunnel setup request packet comprises the information indicating the correspondence.

18. The network device according to claim 16, wherein the one or more processors are further configured to execute the instructions to cause the network device to:
after the first GRE tunnel is set up, receive a first GRE tunnel notify packet sent by the HCPE, wherein an attribute field of the first GRE tunnel notify packet comprises the information used to indicate the correspondence.

19. The network device according to claim 18, wherein the one or more processors are further configured to execute the instructions to cause the network device to:
in a process of setting up the first GRE tunnel, send a GRE tunnel setup accept packet to the HCPE, wherein the GRE tunnel setup accept packet comprises request information used to request the correspondence; and
receive the first GRE tunnel notify packet that is sent by the HCPE according to the request information.

20. The network device according to claim 18, wherein the one or more processors are further configured to execute the instructions to cause the network device to:
send, to the HCPE, a second GRE tunnel notify packet used to request the correspondence; and
receive the first GRE tunnel notify packet that is sent by the HCPE according to the second GRE tunnel notify packet.

21. The network device according to claim 15, wherein access network types of different GRE tunnels of the at least two GRE tunnels are different, and the tunnel identifier of the first GRE tunnel indicates an access network type of the first GRE tunnel.

22. A network device, wherein in a scenario in which there are at least two GRE tunnels between the network device and a hybrid access gateway HAG and the at least two GRE tunnels are bonded, the network device comprises a memory comprising instructions, and one or more processors coupled to the memory and configured to execute the instructions to cause the network device to:
determine a first GRE tunnel, wherein the first GRE tunnel is one of the at least two GRE tunnels; and
send a service packet to the HAG through the first GRE tunnel, wherein the service packet comprises a source IP address of the first GRE tunnel carrying the service packet, so that the HAG looks up a correspondence table according to the source IP address of the first GRE tunnel carrying the service packet, to determine a tunnel identifier of the first GRE tunnel carrying the service packet, wherein the correspondence table comprises a correspondence between the source IP address of the first GRE tunnel and the tunnel identifier of the first GRE tunnel, and the tunnel identifier of the first GRE tunnel uniquely indicates the first GRE tunnel.

23. The network device according to claim 22, wherein the one or more processors are further configured to execute the instructions to cause the network device to: before sending the service packet to the HAG through the first GRE tunnel, send a GRE control packet to the HAG, wherein the GRE control packet comprises information indicates the correspondence between the source IP address of the first GRE tunnel and the tunnel identifier of the first GRE tunnel.

24. The network device according to claim 23, wherein the one or more processors are further configured to execute the instructions to cause the network device to: in a process of setting up the first GRE tunnel, send a GRE tunnel setup request packet to the HAG, wherein an attribute field of the GRE tunnel setup request packet comprises the information indicating the correspondence.

25. The network device according to claim 23, wherein the one or more processors are further configured to execute the instructions to cause the network device to: after the first GRE tunnel is set up, send a first GRE tunnel notify packet to the HAG, wherein an attribute field of the first GRE tunnel notify packet comprises the information indicating the correspondence.

26. The network device according to claim 25, wherein the one or more processors are further configured to execute the instructions to cause the network device to:
in a process of setting up the first GRE tunnel, receive a GRE tunnel setup accept packet sent by the HAG, wherein the GRE tunnel setup accept packet comprises request information requesting the correspondence; and
send the first GRE tunnel notify packet to the HAG according to the request information.

27. The network device according to claim 25, wherein the one or more processors are further configured to execute the instructions to cause the network device to:
receive a second GRE tunnel notify packet sent by the HAG for requesting the correspondence; and
send the first GRE tunnel notify packet to the HAG according to the second GRE tunnel notify packet.

28. The network device according to claim 22, wherein access network types of different GRE tunnels of the at least two GRE tunnels are different, and the tunnel identifier of the first GRE tunnel indicates an access network type of the first GRE tunnel.

* * * * *

UNITED STATES PATENT AND TRADEMARK OFFICE
CERTIFICATE OF CORRECTION

| | |
|---|---|
| PATENT NO. | : 11,817,970 B2 |
| APPLICATION NO. | : 17/118507 |
| DATED | : November 14, 2023 |
| INVENTOR(S) | : Lianshu Zheng et al. |

It is certified that error appears in the above-identified patent and that said Letters Patent is hereby corrected as shown below:

In the Specification

Column 12, Line 11, Change "Prot1" to "Protl";

Column 12, Line 15, Change "Prot1" to "Protl";

Column 12, Line 16, Change "Prot1" to "Protl"; and

Column 12, Line 18, Change "Prot1" to "Protl".

Signed and Sealed this
Twelfth Day of December, 2023

Katherine Kelly Vidal
*Director of the United States Patent and Trademark Office*